(12) United States Patent
Kurachi et al.

(10) Patent No.: US 8,841,368 B2
(45) Date of Patent: Sep. 23, 2014

(54) NONFLAMMABLE POLYESTER RESIN COMPOSITION AND METHOD FOR MANUFACTURING SUCH A RESIN COMPOSITION

(75) Inventors: Yasuo Kurachi, Tokyo (JP); Akira Ohira, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 563 days.

(21) Appl. No.: 12/868,547

(22) Filed: Aug. 25, 2010

(65) Prior Publication Data

US 2011/0054092 A1 Mar. 3, 2011

(30) Foreign Application Priority Data

Sep. 1, 2009 (JP) ................................. 2009-201499

(51) Int. Cl.
| | | |
|---|---|---|
| C08L 67/02 | (2006.01) | |
| C08L 21/00 | (2006.01) | |
| C08K 3/32 | (2006.01) | |
| C08K 5/521 | (2006.01) | |
| C08L 81/04 | (2006.01) | |
| C08L 69/00 | (2006.01) | |
| C08L 77/00 | (2006.01) | |
| C08L 61/02 | (2006.01) | |

(52) U.S. Cl.
CPC ................. *C08L 67/02* (2013.01); *C08L 81/04* (2013.01); *C08L 69/00* (2013.01); *C08L 77/00* (2013.01); *C08L 21/00* (2013.01); *C08K 3/32* (2013.01); *C08L 61/02* (2013.01); *C08K 5/521* (2013.01)
USPC ...... 524/139; 524/141; 524/147; 264/211.12; 425/377; 425/143

(58) Field of Classification Search
CPC ........... C08L 67/02; C08L 21/00; C08K 3/32; C08K 5/521
USPC ..................... 524/139, 141, 147; 264/211.12; 425/377, 143
See application file for complete search history.

(56) References Cited

U.S. PATENT DOCUMENTS 3,960,808 A * 6/1976 Katchman .................... 524/508
5,912,320 A * 6/1999 Hotta et al. .................. 528/373

2002/0011688 A1 * 1/2002 Nodono et al. .......... 264/211.12
2002/0193470 A1 * 12/2002 Masuki et al. .................. 524/86
2003/0009008 A1 * 1/2003 Takenaka et al. .......... 528/502 F

FOREIGN PATENT DOCUMENTS

| CN | 101351504 | | 1/2009 |
|---|---|---|---|
| EP | 0531008 | A | 3/1993 |
| EP | 0761763 | A | 3/1996 |
| JP | 4-337353 | | 11/1992 |
| JP | 05-247328 | A | 9/1993 |
| JP | 06-298991 | A | 10/1994 |
| JP | 08-245756 | A | 9/1996 |
| JP | 11-048301 | * | 2/1999 |
| JP | 20022655798 | | 9/2002 |
| JP | 2003-183486 | A | 7/2003 |
| JP | 2003-200482 | | 7/2003 |
| JP | 2003-213112 | A | 7/2003 |
| JP | 2003-221498 | A | 8/2003 |
| JP | 2003-231796 | A | 8/2003 |
| WO | 2007/078079 | | 7/2007 |

OTHER PUBLICATIONS

Arkema, Functional Additives, 2009, p. 1-16.*
Polymer Processing, Polycarbonate, Copyright 2000, 2001 Polymer Processing.com.*
Arkema, Functional Additives, 2009, p. 1-2.*
Chinese Office Action issued on Mar. 1, 2012 in Chinese Patent Application No. 2010/10269583.X (4 pages) and English language translation of the same (8 pages).
Japanese Office Action and English Translation thereof for Patent Application No. 2009-201499.

* cited by examiner

*Primary Examiner* — James J Seidleck
*Assistant Examiner* — Deve E Valdez
(74) *Attorney, Agent, or Firm* — Lucas & Mercanti, LLP

(57) ABSTRACT

A method for manufacturing a nonflammable polyester resin composition comprising:
  making a polymer mixture containing the following (A) to (E) components in a melted state pass through a space between two parallel faces, with a face-to-face distance x being set to 5 mm or less;
  (A) a polyester resin of 40 to 80% by weight;
  (B) a polycarbonate resin of 5 to 40% by weight;
  (C) a rubbery polymer of 5 to 30% by weight;
  (D) a polyphenylene sulfide resin and/or a phenol resin of 2 to 20% by weight; and
  (E) a phosphorus-containing acid ester compound and/or a polyamide resin of 0.1 to 25% by weight.

19 Claims, 5 Drawing Sheets

10B (A)

(B)

US 8,841,368 B2

NONFLAMMABLE POLYESTER RESIN COMPOSITION AND METHOD FOR MANUFACTURING SUCH A RESIN COMPOSITION

This application is based on application No. 2009-201499 filed in Japan, the contents of which are hereby incorporated by reference.

BACKGROUND OF THE INVENTION

1. Field of the Invention

The present invention relates to a nonflammable polyester resin composition and a method for manufacturing such a polyester resin composition. The present invention also relates to a reusing technique for mold processed products of thermoplastic resins to be disposed as wastes.

2. Description of Related Art

At present, thermoplastic resins, such as polyester resins and polycarbonate resins, and resin compositions thereof have been used in a wide variety of fields as molding materials for products, such as containers, packing films, household articles, office apparatuses, AV apparatuses, electric and electronic parts, automobile parts and the like, because of superior moldability, mechanical properties, heat resistance, weather resistance, outside appearance, sanitary properties and economical efficiency hereof. For this reason, the used amount of mold-processed products of the thermoplastic resins or the resin compositions thereof is very large, and at present, the used amount has also been increased year by year. On the other hand, the amount of spent mold-processed products to be disposed as wastes has also been greatly increased, resulting in serious social problems.

Under these circumstances, in recent years, container and package recycling law and laws (normally, referred to as Green Purchase Laws) relating to promotion of providing environmental products by the Nation or the like have been successively enforced, and public concerns have been focused on material recycles of mold processed products of such thermoplastic resins or the resin compositions thereof. Among these, the establishment of a material recycling technology for PET bottles, made from polyethylene terephthalate (hereinafter, sometimes referred to as PET), whose amount of use has rapidly increased, has become an urgent task. Moreover, along with the wide use of optical recording medium products (optical discs) made from polycarbonate (hereinafter, sometimes referred to as PC), such as CD's, CD-R's, DVD's and MD's, researches have been carried out on a reusing method for waste ends generated upon mold-processing these products and a reuse of transparent PC materials obtained after separating reflecting layers, recording layers and the like from waste optical discs.

However, these mold-processed products of polyester resins such as spent PET bottles, and polycarbonate resins such as optical discs, collected from the market, are inmost cases deteriorated due to hydrolysis and thermal decomposition and the like. For example, when an attempt is made to again mold pulverized materials derived from these mold-processed products, no molding process can be performed due to an extreme reduction in melt-viscosity, or, even if a molded product is obtained, the resulting product is poor in mechanical strength and easily broken, with the result that, at present, it is very difficult to reuse these to provide molded products at a level sufficient for practical use.

As a method for collecting recycle-use resins from waste mold-processed products, for example, a method is proposed in which an ethylene copolymer containing an epoxy group is melt-kneaded in pulverized pieces of mold-processed products of thermoplastic resins, such as PET and PC, or the resin compositions of these (Japanese Patent Application Laid-Open No. Hei 5-247328, Japanese Patent Application Laid-Open No. Hei 6-298991 and the like), or another method is proposed in which an epoxidized diene-based copolymer is melt-kneaded therein (Japanese Patent Application Laid-Open No. Hei 8-245756). Moreover, Japanese Patent Application Laid-Open No. 2003-183486, Japanese Patent Application Laid-Open No. 2003-213112, Japanese Patent Application Laid-Open No. 2003-221498, and Japanese Patent Application Laid-Open No. 2003-231796 have proposed a material technique in which a rubbery polymer is combined with R-PET (recycled PET) so as to improve the impact strength thereof. However, these known techniques use a nonflammable agent containing halogen atoms so as to obtain a high fire-preventive performance, and the addition of the nonflammable agent containing halogen atoms fails to sufficiently improve the impact strength. In the case when the added amount of the nonflammable agent containing halogen atoms is reduced, an insufficient nonflammable performance tends to occur. As a result of these, it is not possible to expand the application. Moreover, the nonflammable agent containing halogen atoms causes a problem of safety against the environment and human bodies due to the halogen atoms contained therein.

In view of the above state of the art, the present inventors and the like made various investigations concerning a recycling method that is practically usable for pulverized materials derived from PET bottles that are typical collected materials made from polyester resins, and based upon the resulting findings, further made investigations concerning a method for utilizing pulverized materials derived from optical discs made from polycarbonate resins. As a result, they have found that a resin composition, obtained through processes in which a polymer mixture containing predetermined (A) to (E) components is subjected to a predetermined space-passing process in its melted state, has superior mechanical performances, and is allowed to exert a self-extinguishing characteristic in the air. It has been found that these effects can be obtained not only by the use of pulverized materials of PET bottles and pulverized materials of PC optical discs, but also by the use of normal virgin PET and PC, and the present invention is thus completed.

An objective of the present invention is to provide a nonflammable polyester resin composition that has a superior nonflammable property, in particular, a self-extinguishing property, without the necessity of containing a halogen-atom-containing nonflammable agent, and also has superior mechanical performances, such as sufficient elastic modulus, bending strength and impact strength, and a method for manufacturing such a resin composition.

Another objective of the present invention is to provide a nonflammable polyester resin composition which, even in the case when polyester resins and/or polycarbonate resins obtained from waste mold-processed products to be disposed are reutilized, exerts a superior nonflammable property, in particular, a self-extinguishing property, without the necessity of containing a halogen-atom-containing nonflammable agent, and also has improved mechanical performances, such as sufficient elastic modulus, bending strength and impact strength, and a method for manufacturing such a resin composition.

SUMMARY OF THE INVENTION

The present invention relates to a method for manufacturing a nonflammable polyester resin composition comprising:

making a polymer mixture containing the following (A) to (E) components in a melted state pass through a space between two parallel faces, with a face-to-face distance x being set to 5 mm or less;
- (A) a polyester resin of 40 to 80% by weight;
- (B) a polycarbonate resin of 5 to 40% by weight;
- (C) a rubbery polymer of 5 to 30% by weight;
- (D) a polyphenylene sulfide resin and/or a phenol resin of 2 to 20% by weight; and
- (E) a phosphorus-containing acid ester compound and/or a polyamide resin of 0.1 to 25% by weight, and the present invention also relates to a nonflammable polyester composition produced by the above-mentioned method.

Figure 1:
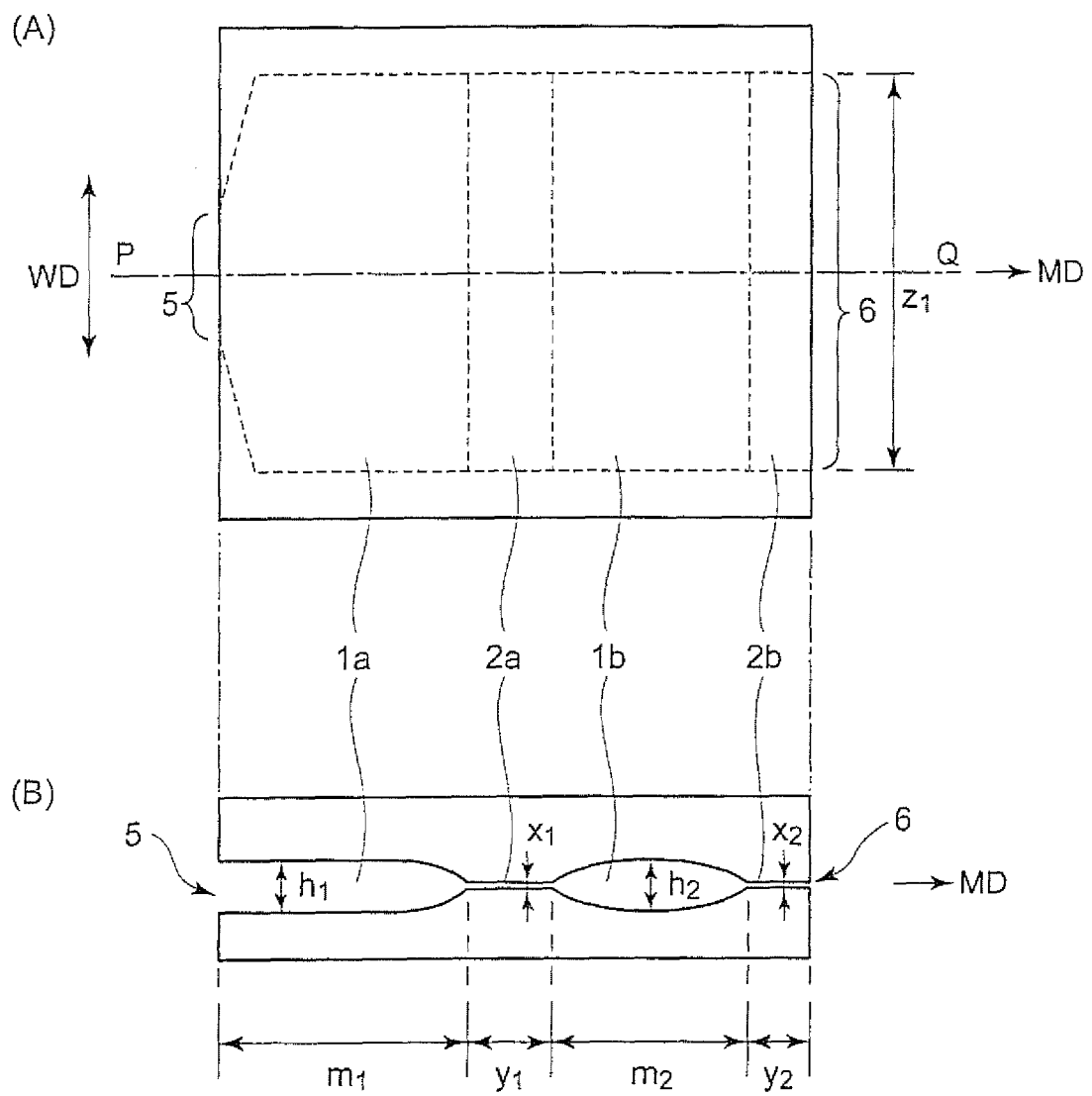
FIG. 1 (A) is a schematic perspective view obtained in the case when, with respect to one example of a manufacturing device that uses a manufacturing method for a nonflammable polyester resin composition of the present invention, the inside of the device is perspectively viewed from above, and FIG. 1 (B) is a schematic cross-sectional view taken along a P-Q cross section of the device of FIG. 1 (A).

DETAILED DESCRIPTION OF THE INVENTION (A) Component

A polyester resin serving as (A) component to be contained into a nonflammable polyester resin composition (hereinafter, sometimes referred to as "resin composition") of the present invention is not particularly limited, and examples thereof include polyester resins obtained by polycondensing dicarboxylic acid units or their derivatives having an ester forming function and diol units or their derivatives having an ester forming function by using a known method.

Specific examples of the dicarboxylic acid units include: those dicarboxylic acid units derived from aromatic dicarboxylic acids, such as terephthalic acid, isophthalic acid, orthophthalic acid, 2,2'-biphenyl dicarboxylic acid, 3,3'-biphenyl dicarboxylic acid, 4,4'-biphenyl dicarboxylic acid, 4,4'-diphenylether dicarboxylic acid, 1,5-naphthalene dicarboxylic acid, 1,4-naphthalene dicarboxylic acid, 2,6-naphthalene dicarboxylic acid, bis (p-carboxyphenyl) methane, anthracene dicarboxylic acid and 5-sulfoisophthalic acid sodium; aliphatic dicarboxylic acids, such as adipic acid, sebacic acid, succinic acid, azelaic acid, malonic acid, oxalic acid and dodecanedione acid; cyclic dicarboxylic acids, such as 1,3-cyclohexane dicarboxylic acid and 1,4-cyclohexane dicarboxylic acid, and their ester-forming derivatives (for example, lower alkyl esters, such as methyl esters and ethyl esters).

Specific examples of the diol units include: those diol component units derived from aliphatic dials having 2-10 carbon atoms, such as ethylene glycol, 1,2-propylene glycol, 1,3-propylene glycol, 1,3-propane diol, 1,4-butane diol, 2,3-butane dial, 1,6-hexane dial, 1,10-decane diol, neopentyl glycol, 2-methyl propane dial and 1,5-pentane dial; alicyclic dials, such as 1,4-cyclohexane dimethanol and 1,4-cyclohexane dial; and polyalkylene glycols having a molecular weight of 6000 or less, such as diethylene glycol, polyethylene glycol, poly-1,3-propylene glycol and polytetramethylene glycol.

As both of these dicarboxylic acid units and diol units, each of the above-mentioned compounds may be used alone, or two kinds or more of them may be used in combination. Moreover, the polyester resin of the present invention may have a structural component unit derived from a tri-functional or greater monomer, such as glycerin, trimethylol propane, pentaerythritol, trimellitic acid, pyromellitic acid or the like, as long as its content is 1 mol % or less relative to the entire structural units.

From the viewpoint of further improving the nonflammable property and the mechanical performances, the polyester resin is preferably prepared as an aromatic polyester resin obtained by polycondensing the aromatic dicarboxylic acids or their derivatives having an ester forming function and the aliphatic dials or their derivatives having an ester forming function.

Specific examples of the polyester resin include: polyethylene terephthalate (hereinafter, sometimes referred to as PET), polybutylene terephthalate (hereinafter, sometimes referred to as PBT), polypropylene terephthalate, polyethylene naphthalate, (hereinafter, sometimes referred to as PEN), polybutylene naphthalate, poly-1,4-cyclohexanedimethylene terephthalate, polycaprolactone, p-hydroxy benzoic acid-based polyester, and polyallylate-based resin. Among these, PET and PEN in which ethylene glycol is used as a diol component are in particular preferably used from the viewpoint of physical balances, such as crystallizing behavior, thermal characteristics and mechanical characteristics. Moreover, PBT in which butylene glycol is used as its diol component is preferably used because of its well balanced molding properties and mechanical characteristics and the like. A mixture of PET and PBT is also preferably used. Moreover, polyethylene naphthalate or a mixture thereof with polyethylene terephthalate is preferably used (preferably, a mixture with PET being set to 50% by weight or more).

Although not particularly limited, the intrinsic viscosity of the polyester resin is preferably set in a range from 0.50 to 1.50 dl/g, more preferably, from 0.65 to 1.30 dl/g in the present invention. When the intrinsic viscosity is too low, it is not possible to obtain a sufficient impact resistant property, and its chemical resistance might be lowered. In contrast, when the intrinsic viscosity is too high, its flow viscosity increases with the result that its kneading temperature needs to be made higher, resulting it a kneading process that is carried out at an unfavorable temperature to additives to be combined therewith.

In the present specification, the intrinsic viscosity is given as a value measured by using a mixed solvent of phenol/tetrachloroethane (weight ratio: 1/1) at 30° C.

Normally, the polyester resin has a melting point in a range from 180 to 300° C., more preferably, from 220 to 290° C., with its glass transition temperature being set in a range from 50 to 180° C., more preferably, from 60 to 150° C.

In the present specification, the melting point is defined as an end-point temperature of a crystalline melting endothermic peak that is exerted upon measuring with a temperature rised by using a differential scanning calorimeter (DSC).

The glass transition temperature refers to a temperature of a portion at which, in the same measuring process as that of the melting point, the base line is changed step by step. More specifically, in the same measuring process as that of the melting point, the glass transition temperature refers to a temperature at a point where a straight line, located with the same distance from straight lines extended from the respective base lines before and after a portion that varies in a manner like steps, intersects with a curved line corresponding to the step-like changing portion.

As the polyester resin, resin pieces, obtained by pulverizing waste polyester resin products, may be used. In particular, as the PET having its intrinsic viscosity within the above-mentioned range, pulverized articles derived from spent waste PET products such as PET bottles, may be preferably used. Those bottles, sheets, clothes that are PET products that have been collected as wastes, as well as molding scraps and fiber scraps generated upon molding these molded products, may be pulverized into resin pieces having appropriate sizes, and used. Among these, pulverized materials derived from drinking bottles the amount of which is very large may be preferably used. In general, after having been classified and collected, and subjected to a foreign-matter removing process, a pulverizing process and a washing process, the PET bottles are regenerated as transparent clear flakes having a size from 5 to 10 mm. Normally, the intrinsic viscosity of these clear flakes is in an approximately range from 0.60 to 0.80 dl/g.

Those polyester resin pieces derived from waste polyester resin products may be obtained through processes in which, after having been pulverized and washed, the resulting pieces are then once kneaded at a temperature in a range from 180° C. or more to less than 260° C., and cooled and again pulverized.

The virgin polyester resin in a form of pellets are commercially available, and these may be pressed at its glass transition temperature or more, or may be once melted by an extruder or the like, and the melted strand may be squashed through rollers in a cooling water, and subjected to a cutting process or the like by using a normally-used pelletizer so that the resulting resin pieces may be used.

By using the polyester resin as resin pieces, it is possible to easily carry out a supplying process to a kneader upon manufacturing a resin composition, and also to reduce a load applied to the kneader during the kneading process until a melting process. As the shape of the polyester resin pieces, for example, a flake shape, a block shape, a powder shape and a pellet shape is preferably used, and the flake shape is in particular preferably used. The maximum length of the resin pieces is preferably set to 30 mm or less, more preferably, to 20 mm or less, furthermore preferably, to 10 mm or less. Even if resin pieces having the maximum length exceeding 30 mm are included, the kneading process can be carried out; however, clogging might occur during the supplying process, failing to provide a preferable process. Since this can be prevented by improving the supplying device, no specific limitation is given thereto as long as the objective of the present invention is not impaired.

The contained amount of (A) component is set to 40 to 80% by weight relative to the total amount of the composition, and from the viewpoints of further improving the nonflammable property and mechanical performances, it is preferably set to 50 to 75% by weight. When the contained amount of (A) component is too small, the dispersion state of the other components varies, with the result that the self-extinguishing property is lowered and mechanical properties, in particular, impact strength and bending strength, are lowered. In the case when the contained amount is too large, since the nonflammable property is lowered and the self-extinguishing property is lost, the objective of the present invention is no longer achieved. Moreover, mechanical properties, such as in particular, impact strength, are lowered. The polyester resin may be a mixture of two kinds or more of polyester resins having different structural units and/or intrinsic viscosities, and, for example, a mixture of PET and PEN, or a copolymer of PET and PEN in which a PEN component is inserted into a primary bond of PET, may be used, and in this case, the total contained amount of these is set within the above-mentioned range.

(B) Component

The polycarbonate resin (hereinafter, sometimes referred to as PC) serving as (B) component is aromatic polycarbonate obtained by making dihydric phenol and a carbonate precursor react with each other. Any known method may be used as the producing method, and, for example, a method for making a carbonate precursor, such as phosgene, directly react with dihydric phenol (interfacial polymerization method) and a method in which dihydric phenol and a carbonate precursor, such as diphenyl carbonate, are subjected to an ester exchange reaction in a melted state (solution method) have been known.

Examples of dihydric phenol include: hydroquinone, resorcine, dihydroxydiphenyl, bis(hydroxyphenyl) alkane, bis(hydroxyphenyl) cycloalkane, bis(hydroxyphenyl) sulfide, bis(hydroxyphenyl)ether, bis(hydroxyphenyl) ketone, bis(hydroxyphenyl) sulfone, bis(hydroxyphenyl) sulfoxide, bis(hydroxyphenyl) benzene and derivatives of these with cores being substituted by an alkyl group or a halogen atom. Typical examples of particularly desirable dihydric phenols include: 2,2-bis(4-hydroxyphenyl)propane (generally known as bisphenol 2,2-bis{(4-hydroxy-3-methyl)phenyl}propane, 2,2-bis{(3,5-dibromo-4-hydroxy)phenyl}propane, 2,2-bis(4-hydroxyphenyl)butane, 1,1-bis(4-hydroxyphenyl)cyclohexane, 1,1-bis(4-hydroxyphenyl)-3,3,5-trimethylcyclohexane, 4,4'-dihydroxydiphenyl sulfone and bis {(3,5-dimethyl-4-hydroxy)phenyl}sulfone, and these may be used alone or as a mixture of two or more thereof. Among these, in particular, bisphenol A is preferably used.

Although not particularly limited thereby, examples of the carbonate precursor include: diaryl carbonates, such as diphenyl carbonate, ditolyl carbonate and bis(chlorophenyl) carbonate, dialkyl carbonates, such as dimethyl carbonate and diethyl carbonate, carbonyl halides such as phosgene, and haloformates such as dihaloformate of dihydric phenol. Preferably, diphenyl carbonate is used. These carbonate precursors may be used alone or as a mixture of two or more thereof.

The polycarbonate resin may be a branched polycarbonate resin that is prepared by copolymerizing trifunctional or greater polyfunctional aromatic compounds, such as 1,1,1-tris(4-hydroxyphenyl)ethane and 1,1,1-tris(3,5-dimethyl-4-hydroxyphenyl)ethane, or a polyester carbonate resin that is prepared by copolymerizing aromatic or aliphatic difunctional carboxylic acids. Moreover, a mixture containing two kinds or more of the resulting polycarbonate resins may be used.

The molecular weight of the polycarbonate resin is normally set in a range from $1\times10^4$ to $1\times10^5$ in the viscosity average molecular weight, and the viscosity average molecular weight of the polycarbonate resin to be used in the present invention is preferably set in a range from 10,000 to 40,000, more preferably, from 12,000 to 35,000.

In the present specification, the viscosity average molecular weight is obtained as a measured value by a CBM-20Alite system and GPC software (made by Shimadzu Corporation).

The polycarbonate resin is normally designed to have a glass transition temperature from 120 to 290° C., preferably, from 140 to 270° C.

As the polycarbonate resin, resin pieces obtained by pulverizing waste polycarbonate resin products may be used. In particular, as the polycarbonate with its molecular weight set in the above-mentioned range, pulverized materials derived from waste optical discs and the like may be preferably used. Waste end-materials generated upon mold-processing optical discs, such as CDs, CD-Rs, DVDs and MDs, and optical lens, and those materials prepared by separating reflection layers, recording layers and the like from waste optical discs, are pulverized into appropriate sizes of 10 mm or less, and the resulting resin pieces can be used without particular limitation in the present invention. In general, as the polycarbonate resin for use these optical discs, those resins of the highly flowable type having a low molecular weight in a range from 13,000 to 18,000 have been used.

Those polycarbonate resin pieces derived from waste polycarbonate resin products may be obtained through processes in which, after having been pulverized and washed, the resulting pieces are then once kneaded at a temperature in a range from 180° C. or more to less than 260° C., and cooled and again pulverized.

The virgin polycarbonate resin in a form of pellets are commercially available, and these may be pressed at its glass transition temperature or more, or may be once melted by an extruder or the like, and the melted strand may be squashed through rollers in a cooling water, and subjected to a cutting process or the like by using a normally-used pelletizer so that the resulting resin pieces may be used.

By using the polycarbonate resin as resin pieces, it is possible to easily carry out a supplying process to a kneader upon manufacturing a resin composition, and also to reduce a load applied to the kneader during the kneading process until a melting process. As the shape of the polycarbonate resin pieces, for example, a flake shape, a block shape, a powder shape and a pellet shape is preferably used, and the flake shape is it particular preferably used. The maximum length of the resin pieces is preferably set to 30 mm or less, more preferably, to 20 mm or less, furthermore preferably, to 10 mm or less. Even if resin pieces having the maximum length exceeding 30 mm are included, the kneading process can be carried out; however, clogging might occur during the supplying process, failing to provide a preferable process. Since this can be prevented by improving the supplying device, no specific limitation is given thereto as long as the objective of the present invention is not impaired.

The contained amount of (B) component is set to 5 to 40% by weight relative to the total amount of the composition, and from the viewpoints of further improving the elastic modulus and the nonflammable property, it is preferably set to 10 to 30% by weight. When the contained amount of (B) component is too small, the nonflammable property is lowered and the self-extinguishing property is lost. Moreover, mechanical properties, in particular, impact strength and bending strength, are lowered. In the case when the contained amount is too large, the self-extinguishing property is lowered and the mechanical properties, in particular, impact strength and bending strength, are lowered. The component may be a mixture of two kinds or more of polycarbonate resins, and in this case, the total contained amount as the (B) component is set within the above-mentioned range.

(C) Component

A rubbery polymer serving as a (C) component is a component required for giving an impact resistant property to the resin composition of the present invention, and as this component, rubbery compounds, described in "Introduction to Rubber Technique" (edited by Japan Rubber Institute, published by Maruzen Co., Ltd.) and "Material Designing and Mold-Processing of Thermoplastic Elastomer" (supervised by Shinzo Yamashita, published by Technical Information Institute), can be used.

The rubbery polymer is a polymer having at least one glass transition point (Tg) at a temperature of 20° C. or less.

For example, rubbery polymers made from one kind of monomer, such as polydimethyl silicone rubber that is one kind of silicone rubber, natural rubber, polybutadiene rubber (BR), polyisoprene rubber (IR) and polychloroprene rubber (CR), have only one Tg and the Tg thereof is 20° C. or less.

Moreover, thermoplastic elastomers, such as urethane rubber, and graft copolymer rubbers made from two kinds or more monomers, such as butadiene-styrene graft copolymer rubber (SBR), butadiene-acrylonitrile graft copolymer rubber, ethylene-propylene-(dienemethylene) graft copolymer rubber (EPDM), isobutylene-isoprene graft copolymer rubber (IIR), styrene-butadiene-styrene graft copolymer rubber, styrene-butadiene-styrene radial graft-tercopolymer rubber and styrene-isoprene-styrene graft copolymer rubbers, have only one Tg and the Tg thereof is 20° C. or less.

Furthermore, for example, block copolymer rubbers, made from two kinds or more monomers, such as styrene-butadiene-styrene block copolymer rubber, styrene-butadiene-styrene radial block-tercopolymer rubber, styrene-isoprene-styrene block copolymer rubber, butadiene-styrene block copolymer rubber (SBR), butadiene-acrylonitrile block copolymer rubber, ethylene-propylene-(diene methylene) block copolymer rubber (EPDM) and isobutylene-isoprene block copolymer rubber (IIR), have structures in which a Tg is observed at each segment of the respective blocks; therefore, these have two or more Tg's so that at least one of the Tg's may be set to 20° C. or less, with the other Tg being set to 20° C. or lessor being set to above 20° C.

In the case when the number-average molecular weight of the rubbery polymer is too small, mechanical properties, such as strength and extension at the time of breaking of the polymer, deteriorate, with the result that the strength of the resulting composition might be lowered, while in contrast, in the case when it is too large, the processability becomes poor to cause a possibility of failure in obtaining a composition having sufficient performances; therefore, the number-average molecular weight is preferably set in a range from 30,000 to 500,000, more preferably, from 50,000 to 300,000.

As such rubbery polymers, for example, conjugated diene rubber, urethane rubber (UR) and silicone rubber may be used.

The conjugated diene rubber is a monopolymer or copolymer rubber containing a conjugated diene monomer. The content of the conjugated diene monomer is normally set to 10% by weight or more, preferably, 10 to 50% by weight, relative to the entire monomer components.

Specific examples of the conjugated diene rubber include: natural rubber, polybutadiene rubber (BR), butadiene-styrene copolymer rubber (SBR), polyisoprene rubber (IR), butadiene-acrylonitrile copolymer rubber, ethylene-propylene-(diene methylene) copolymer rubber (EPDM), isobutylene-isoprene copolymer rubber (IIR), styrene-butadiene-styrene copolymer rubber, styrene-butadiene-styrene radial tercopolymer rubber, styrene-isoprene-styrene copolymer rubber, polychloroprene (CR) and the like. Among these specific examples, the copolymer rubber is defined as including graft copolymer rubbers and block copolymer rubbers.

Specific examples of the urethane rubber (UR) include: polyether-based UR and polyester-based UR serving as soft segments that exert rubber characteristics.

Specific examples of silicone rubber include: silicone rubber of a millable type and silicone rubber of an LIMS type, and the silicone rubber of the millable type having a cross-linking group is preferably applied to the present invention; however, that of the LIMS type may be used in the case when the rubber, produced through a cross-linking reaction, is pulverized.

Among the above-mentioned rubbery polymers, the conjugated diene rubber, the urethane rubber and the silicone rubber are preferably used from the viewpoint of the outside appearance of the molded product. Among the conjugated diene rubbers, in particular, BR, SBR, EPDM and IIR are preferably used because these rubbers are easily cross-linked during the kneading process.

The rubbery polymer, obtained through any manufacturing method, may be used, or the rubbery polymer, obtained as a commercially available product, may be used.

Specific examples of commercially available conjugated diene rubbers include: EPDM (Nordel IP; made by Dow Chemical Company), Esprene (made by Sumitomo Chemical Industries Co.) and Royalene (made by Uniroyal Chemical Co., Ltd.).

Specific examples of commercially available urethane rubbers include: Iron Rubber (made by Unimatec Co., Ltd.) and adipate-based E885PFAA (made by Nippon Miractran Co., Ltd.).

Specific examples of commercially available silicone rubbers include: one-liquid type RTV rubber (made by Shin-Etsu Chemical Co., Ltd.), silicone varnish and the like (made by Shin-Etsu Chemical Co., Ltd.) and millable-type silicone rubber (made by Momentive Performance Materials Inc.).

In the resin composition of the present invention, the rubbery polymer (C) is dispersed with an average particle size from 1 nm to 20 μm, and from the viewpoints of impact strength and elastic modulus, the dispersion particle size is preferably set from 1 nm to 15 μm, more preferably, from 10 nm to 10 μm. When the dispersion particle size of the rubbery polymer (C) is too small, no toughness improving effect can be obtained to cause degradation of the bending strength and the impact strength. When the dispersion particle size is too large, the elastic modulus is lowered. Such a dispersion particle size is maintained also in the resulting molded product obtained by using the corresponding resin composition.

Figure 5:
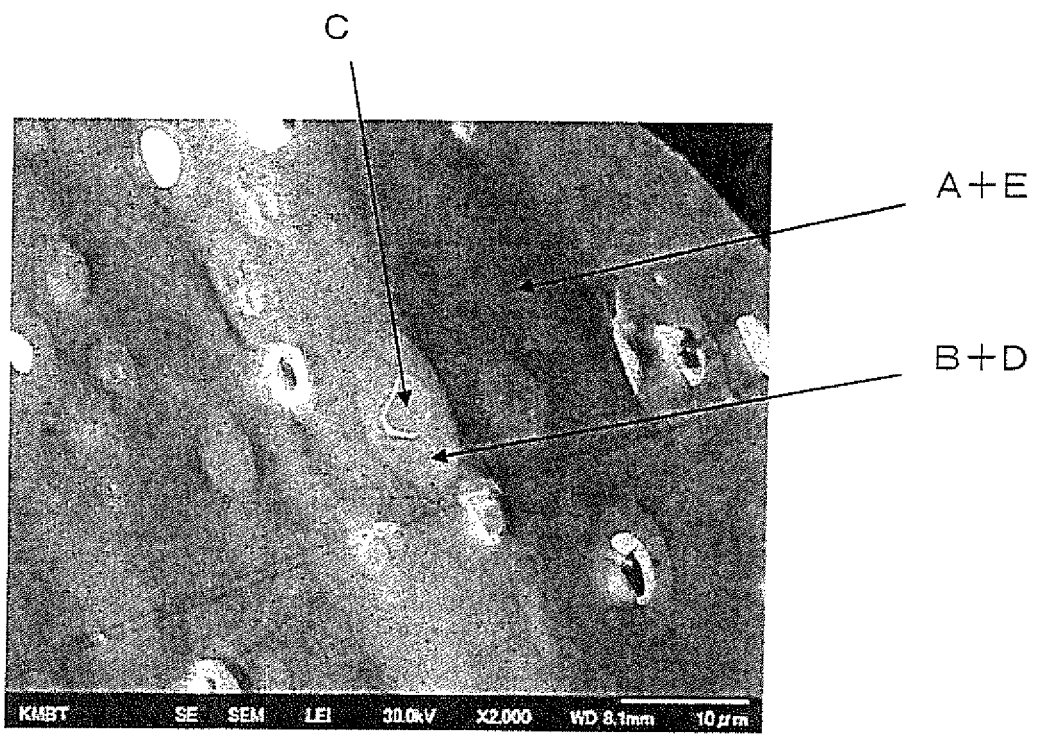
FIG. 5 shows a SEM photograph of a test piece obtained by using a resin composition in accordance with example 2.

The rubbery polymer (C) exists as islands relative to a sea containing at least the (A) component. The (B) component also exists as islands relative to the sea containing at least the (A) component, and the (D) component is preferably compatible with the (A) phase or (B) phase, and is more preferably compatible with the (B) component to form islands. The (E) component is compatible with the (A) component to form a sea. More specifically, the rubbery polymer (C) may exist as islands so as to directly form interfaces with a sea containing the (A) component and (E) component, or may exist as islands so as to indirectly form the interface relative to a sea containing the (A) component and (E) component, or may exist as islands with a composite mode of these formation. In the case when the rubbery polymer (C) exists as islands that indirectly have interfaces relative to a sea containing the (A) component and (E) component, the islands of the (B) component and (D) component exist as differencial islands from the islands of the rubbery polymer (C). The expression that the rubbery polymer (C) exists as islands so as to indirectly from the interface relative to the sea containing the (A) component and (E) component means that, for example, as shown in FIG. 5, the islands containing the (B) component and (D) component exist relative to the sea containing the (A) component and (E) component, with the rubbery polymer (C) existing as further islands in each island containing the (B) component and (D) component. Whether the rubbery polymer (C) forms the islands that directly float on the sea containing the (A) component and (E) component or it forms the islands that directly float on the sea containing the (B) component and (D) component depends on the composition ratios of the respective components and the processing conditions.

The dispersion particle size of the rubbery polymer (C) can be measured by the following method. The resin composition (pellets) or a molded product obtained by using the resin composition is cut by an electron microscope thin-film cut-out machine, and the cross section of the rubbery polymer (C) is dyed by using osmium tetraoxide or the like. The cross section is observed in a magnification of 2000 to 10000 times by using a scanning-type electron microscope. The maximum length of the rubbery polymer (C) particles thus dyed is measured with respect to every arbitrary 100 particles, and the average value thereof is found.

The contained amount of the (C) component is set to 5 to 30% by weight relative to the total amount of the composition, and from the viewpoints of further improving the non-flammable property and mechanical performances, it is preferably set to 5 to 20% by weight, more preferably to 5 to 15% by weight. When the contained amount of (C) component is too small, the self-extinguishing property is lowered, and mechanical properties, in particular, impact strength and bending strength, are lowered. In the case when the contained amount is too large, the self-extinguishing property is lowered, and the mechanical properties, in particular, impact strength, bending strength and elastic modulus, are lowered.

(D) Component

As the (D) component, polyphenylene sulfide (hereinafter, sometimes referred to as PPS) and/or a phenol resin are used.

PPS refers to polyphenylene sulfide that is effectively used as so-called engineering plastics.

As the PPS, those having a softening point Tm in a range from 240 to 300° C., preferably, from 240 to 290° C., are used.

In the present specification, the softening point is a value measured by a DSC7020 (made by Seiko Instruments Inc.).

The PPS, produced by a known method, may be used, or the PPS, obtained as a commercially available product, may be used.

As the commercially available products of the PPS, for example, Torelina (made by Toray Industries, Inc.), PPS (made by DIC Co., Ltd.) and the like may be used.

The phenol resin is prepared as a polymer substance obtained by addition-condensation processes between phenols and aldehydes.

Examples of phenols include: phenol, cresol, xylenol, p-alkyl phenol, p-phenyl phenol, chlorophenol, bisphenol A, phenol sulfonic acid, resorcine and the like.

Examples of aldehydes include: formalin, furfural and the like.

As the phenol resin, based upon their raw materials, for example, phenol-formalin resin, cresol-formalin resin, modified phenol resin, phenol-furfural resin, resorcine resin and the like have been known.

As the phenol-formalin resin, based upon their producing methods, those of the novolac type in which a precursor substance produced by using an acidic catalyst and this is subjected to a curing reaction by using an alkali catalyst, and those of the resole type in which a precursor substance is produced by using an alkali catalyst and this is subjected to a curing reaction by using an acidic catalyst have been known.

As the phenol resin, phenol-formalin resin, in particular, phenol-formalin resin of the novolac type, is preferably used.

Any of phenol resins of powder state or liquid state may be used to achieve the objective of the present invention. Preferable phenol is a phenol resin that is in a powder form at room temperature. This phenol resin is preferably used because it is superior in handling performance at the time of precise weighing. The melting point of this phenol resin is preferably set in a range from 30° C. or more to 150° C. or less, because that can be used as a cross-linking agent for the rubbery polymer. More preferably, it is set in a range from 60° C. to 120° C. or less.

A phenol resin, produced by a known method, may be used, or a phenol resin, obtained as a commercially available product, may be used.

As the commercially available products of phenol resin, for example, PR-HF-3 (made by Sumitomo Bakelite Co., Ltd.) Phenol Resin SP90 (made by Asahi Organic Chemicals Industry Co., Ltd.) and the like may be used.

From the viewpoint of self-extinguishing property, at least a phenol resin is preferably used, and it is more preferable to use a phenol resin and PPS in combination.

The contained amount of the (D) component is set to 2 to 20% by weight relative to the total amount of the composition, and from the viewpoints of further improving the non-flammable property and mechanical performances, it is preferably set to 4 to 20% by weight, more preferably to 7 to 15% by weight. In the case when the contained amount of (D) component is, in particular, set to 2% by weight or more, the molded product produced by using the resulting resin composition is allowed to exert a self-extinguishing property; in the case when it is set to 4% by weight or more, the burning rate becomes slower; and in the case when it is set to 7% by weight or more, the molded product is hardly ignited even when the fire of a match is brought close to it. When the contained amount of the (D) component is too small, the self-extinguishing property is lowered, and among mechanical properties, in particular, the bending strength is lowered. In the case when the contained amount is too large, the self-extinguishing property is lowered, and mechanical properties, in particular, impact strength and bending strength, are lowered. Each of the PPS and phenol resin may be a mixture of two kinds or more polymers having different types and/or softening and melting points, and the PPS or phenol resin may be used alone or in combination of two or more kinds. In this case, the total contained amount of these is preferably set in the above-mentioned range.

(E) Component

As the (E) component, a phosphorus-containing acid ester compound and/or polyamide resin (hereinafter, sometimes referred to as PA) can be used.

Examples of the phosphorus-containing acid ester compound include: esterified products of phosphorous acid, phosphoric acid, phosphonous acid, phosphonic acid, and the like.

Specific examples of phosphorous acid esters include: triphenyl phosphite, tris (nonylphenyl) phosphite, tris (2,4-di-t-butylphenyl) phosphite, distearyl pentaerythritol diphosphite, bis(2,6-di-t-butyl-4-methylphenyl) pentaerythritol diphosphite, bis (2,4-di-t-butylphenyl) pentaerythritol diphosphite and the like.

Specific examples of phosphoric acid esters include: triphenyl phosphate (TPP), tris(nonylphenyl) phosphate, tris (2,4-di-t-butylphenyl) phosphate, distearyl pentaerythritol diphosphate, bis(2,6-di-t-butyl-4-methylphenyl) pentaerythritol diphosphate, bis(2,4-di-t-butylphenyl) pentaerythritol diphosphate, tributyl phosphate, bisphenol A bis-diphenyl phosphate and the like.

Specific examples of phosphonous acid esters include: tetrakis(2,4-di-t-butylphenyl)-4,4'-biphenylene phosphonite, and the like.

Specific examples of phosphonic acid esters include: dimethyl benzene phosphonates, benzene phosphonates, and the like.

As the phosphorus-containing acid ester compound, esterified products of phosphorous acid, phosphoric acid and phosphonic acid, are preferred, and, in particular, phosphoric acid ester is preferably used.

PA is a resin referred to also as nylon resin. Not particularly limited, various kinds of polyamides can be used as the PA. Specific examples thereof include: polyamides obtained by ring opening polymerization of lecterns such as ε-caprolactam and ω-dodecalactam; polyamides derived from amino acid such as 6-aminocaproic acid, 11-aminoundecanoic acid, 12-aminododecanoic acid and the like; polyamides derived from aliphatic, alicyclic or aromatic diamines, such as ethylene diamine, tetramethylene diamine, hexamethylene diamine, undecamethylene diamine, dodecamethylene diamine, 2,2,4-/2,4,4-trimethylhexamethylene diamine, 1,3- and 1,4-bis (aminomethyl)cyclohexane, bis(4,4'-aminocyclohexyl) methane, and metha- and para-xylylene diamine, and aliphatic, alicyclic or aromatic dicarboxylic acids, such as adipic acid, suberic acid, sebacic acid, dodecane diacid, 1,3- and 1,4-cyclohexane dicarboxylic acid, isophthalic acid, terephthalic acid, dimer acid and the like, or acid derivatives of acid halogenides thereof (for example, acid chlorides), and copolymerized polyamides thereof; and mixed polyamides of these. In the present invention, among these, polytetramethylene adipamide (Nylon 46), polyamide between methaxylylene diamine and adipic acid, polycaproamide (Nylon 6), polyundecane amide (Nylon 11), polydodecane amide (Nylon 12), polyhexamethylene adipamide (Nylon 66) and copolymerized polyamides mainly composed of raw materials of these polyamide, and these compounds are effectively used.

From the economic point of view, generally-used 6-Nylon, 6,6-Nylon, 4,6-Nylon and 12-Nylon are preferably in the PA.

The degree of polymerization of the PA is not particularly limited, and for example, polyamides having a relative viscosity (obtained by a process in which 1 g of polymer is dissolved in a 98% concentrated sulfuric acid (100 ml), and measured at 25° C.) in a range from 2.0 to 5.0 are used.

Not particularly limited, a known melt polymerization method, solution polymerization method and a combined method of these may be used as the polymerization method of PA.

Moreover, the PA may be commercially available as 6-Nylon (made by Toray Industries, Inc.), MXD6 (made by Mitsubishi Gas Chemical Co., Inc.), 4,6 Nylon (made by DSM Japan Engineering Plastics Co., Ltd.), Zytel (made by E. I. DuPont de Nemours and Company), and the like.

The contained amount of (E) component is set to 0.1 to 25% by weight relative to the total amount of the composition, and from the viewpoint of further improving the non-flammable property, it is preferably set to 0.1 to 12% by weight, more preferably to 1 to 10% by weight. When the contained amount of (E) component is too small, the non-flammable property is extremely lowered, and after catching fire, the resin composition is kept burning in the air, failing to provide the self-extinguishing property. And, mechanical properties, in particular, bending strength and elastic modulus are lowered. In the case when the contained amount is too large, the self-extinguishing property is lowered, and mechanical properties, in particular, impact strength and bending strength, are lowered. Each of the phosphorus-containing acid ester compound and PA may be prepared as a mixture of two kinds or more substances having different types and/or relative viscosities, and the phosphorus-containing acid ester compound or the PA may be used alone or in combination of two or more kinds. In this case, the total contained amount of these is preferably set in the above-mentioned range.

As preferable combinations of the (A) to (E) components, the following combinations are proposed:
<1> (A) PET-(B) PC-(C) EPDM-(D) PPS-(E) TPP;
<2> (A) PET-(B) PC-(C) EPDM-(D) Phenol Resin-(E) TPP;
<3> (A) PET-(B) PC-(C) EPDM-(D) PPS-(E) PA;
<4> (A) PET-(B) PC-(C) EPDM-(D) Phenol Resin-(E) PA;
<5> (A) PET+PEN-(B) PC-(C) EPDM-(D) PPS-(E) TPP;
<6> (A) PET+PEN-(B) PC-(C) EPDM-(D) Phenol Resin-(E) TPP;
<7> (A) PET+PEN-(B) PC-(C) EPDM-(D) PPS-(E) PA;
<8> (A) PET+PEN-(B) PC-(C) EPDM-(D) Phenol Resin-(E) PA;
<9> (A) PET-(B) PC-(C) EPDM-(D) PPS and Phenol Resin in Combination-(E) TPP;
<10> (A) PET-(B) PC-(C) SBR-(D) PPS and Phenol Resin in Combination-(E) TPP;
<11> (A) PET-(B) PC-(C) BR-(D) PPS and Phenol Resin in Combination-(E) TPP;
<12> (A) PET-(B) PC-(C) EPDM-(D) PPS and Phenol Resin in Combination-(E) TPP;
<13> (A) PET-(B) PC-(C) SBR-(D) PPS and Phenol Resin in Combination-(E) TPP;
<14> (A) PET-(B) PC-(C) BR-(D) PPS and Phenol Resin in Combination-(E) TPP;
<15> (A) PET-(B) PC-(C) EPDM-(D) PPS and Phenol Resin in Combination-(E) PA;
<16> (A) PET-(B) PC-(C) SBR-(D) PPS and Phenol Resin in Combination-(E) PA;
<17> (A) PET-(B) PC-(C) ER-(D) PPS and Phenol Resin in Combination-(E) PA;
<18> (A) PET-(B) PC-(C) EPDM-(D) PPS and Phenol Resin in Combination-(E) PA;
<19> (A) PET-(B) PC-(C) SBR-(D) PPS and Phenol Resin in Combination-(E) PA;
<20> (A) PET-(B) PC-(C) BR-(D) PPS and Phenol Resin in Combination-(E) PA;
<21> (A) PET+PEN-(B) PC-(C) EPDM-(D) PPS and Phenol Resin in Combination-(E) TPP;
<22> (A) PET+PEN-(B) PC-(C) EPDM-(D) PPS and Phenol Resin in Combination-(E) TPP;
<23> (A) PET+PEN-(B) PC-(C) EPDM-(D) PPS and Phenol Resin in Combination-(E) PA;
<24> (A) PET+PEN-(E) PC-(C) EPDM-(D) PPS and Phenol Resin in Combination-(E) PA The resin composition of the present invention may contain other generally-used additives, such as a cross-linking agent, a pigment, a dye, a reinforcing agent (glass fibers, carbon fibers, talc, mica, clay minerals, potassium titanate fibers and the like), a filler (titanium oxide, metal powder, wood powder, rice husks and the like), a heat stabilizer, an oxidative degradation preventive agent, an ultraviolet-ray absorbing agent, a lubricant, a releasing agent, a crystal core agent, a plasticizer, a flame retarder, an antistatic agent, a foaming agent and the like, within such a range as not to impair the effects of the present invention. Among these, from the viewpoint of suppressing an ester exchanging reaction of a polyester resin and a polycarbonate resin and thermal decomposition, stabilizers, such as the cross-linking agent, heat stabilizer and oxidative degradation preventive agent, are preferably added thereto.

The cross-linking agent is used for accelerating the cross-linking reaction of the rubber polymer (C), and for example, peroxides are preferably used as the cross-linking agent. Specific examples of the peroxides include: acetylcyclohexylsulfonyl peroxide, isobutyl peroxide, diisopropylperoxydicarbonate, di-n-propylperoxy dicarbonate, di(2-methoxyethyl) peroxy dicarbonate, di(methoxyisopropyl) peroxy carbonate, di(2-methylhexyl) peroxy dicarbonate, t-butylperoxy neodecanoate, 2,4-dichlorobenzoyl peroxide, t-butylperoxy pivalate, 3,5,5-trimethylhexanol peroxide, octanol peroxide, decanol peroxide, laurol peroxide, stearol peroxide, propionyl peroxide, acetyl peroxide, t-butylperoxy (2-ethylhexanoate), benzoxy peroxide, t-butylperoxy isobutylate, 1,1-bis(t-butylperoxy) 3,3,5-trimethyl cyclohexanone, 1,1-bis(t-butylperoxy) cyclohexanone, t-butylperoxy maleic acid, succinic acid oxide, t-butylperoxy laurate, t-butylperoxy 3,5,5-trimethylhexanoate, cyclohexanone peroxide, t-butylperoxy isopropylcarbonate, 2,5-dimethyl-2,5-di(benzoylperoxy) hexane, t-butylperoxy acetate, 2,2-bis(t-butylperoxy) butane, t-butylperoxy benzoate, di-t-butyldiperoxy phthalate, n-butyl-4,4-bis(t-butylperoxy) valerate, methylethylketone peroxide, dicumyl peroxide, 2,5-dimethyl-2,5-di(t-butylperoxy) hexane, t-butylcumyl peroxide, t-butylhydroperoxide, di-isopropylbenzene hydroperoxide, di-t-butyl peroxide, p-menthane hydroperoxide, 2,2-dimethyl-2,5-di(t-butylperoxy) hexyne-3,1,1,3,3-tetramethylbutyl hydroperoxide, 2,5-dimethylhexane-2,5-dihydroxy peroxide, cumene hydroperoxide, and the like.

The contained amount of the cross-linking agent is preferably set in a range from 0.01 to 0.1% by weight, more preferably, from 0.01 to 0.05% by weight, relative to the total amount of the resin composition.

As the heat stabilizer, phosphorus-based, hindered phenol-based, amine-based and thioether-based compounds may be used. Among these, thioether-based compounds are preferably used, and as the thioether-based compounds, dilaurylthiodipropionate, dimyristylthiodipropionate, distearylthiodipropionate, laurylstearylthiodipropionate, tetrakis[methylene-3-(dodecylthio) propionate]methane and the like are proposed.

The contained amount of the heat stabilizer is preferably set to 0.001 to 1% by weight, more preferably, 0.01 to 0.5% by weight, relative to the total amount of the resin composition.

Method for Manufacturing Nonflammable Polyester Resin Composition

The method for manufacturing the resin composition in accordance with the present invention is characterized in that a polymer mixture containing at least the (A) to (E) components is subjected to a space-passing process in its melted state.

The space-passing process refers to a process in which the polymer mixture in its melted state is made to pass through a space between two parallel faces, with a face-to-face distance x being set to 5 mm or less, and in the present invention, the space-passing processes are carried out one time or more, preferably, two times or more, more preferably, three times or more. With this process, the respective components contained in the polymer mixture are sufficiently mixed and dispersed uniformly so that the resulting resin composition has a superior nonflammable property, in particular, a self-extinguishing property, without the necessity of containing a halogen-atom-containing nonflammable agent, and the resin composition also has sufficiently improved mechanical performances, such as sufficient elastic modulus, bending strength and impact strength. Such effects are also exerted in molded products obtained by using the resin composition. As the number of the times of the space-passing processes increases, the self-extinguishing property and mechanical performances are remarkably improved. For example, when the number of times of the space-passing process is increased from one time to two times, the self-extinguishing property and mechanical performances are remarkably improved. In the case when the number of times of the space-passing processes is increased from two times to three times, the self-extinguishing property and mechanical performances are further remarkably improved. The upper limit of the number of times of the space-passing processes is normally set to 1000 times, in particular, to 100 times. Even if the polymer mixture is made to pass through a space having a face-to-face distance x exceeding 5 mm, the uniform mixing and dispersing processes are not sufficiently achieved, and the nonflammable property and mechanical performances, such as the elastic modulus, bending strength and impact strength, are lowered. Even when the distance in the moving direction of the polymer mixture in such a space is extended, it is not possible to sufficiently achieve uniform mixing and dispersing processes. The number of times of the space-passing processes can be reduced by carrying out the processes after a kneading operation by a single-screw or twin-screw kneader, and for example, in the case when the space-passing processes are successively carried out by using a device attached to the discharge opening of the twin-screw kneader, the number of times of the process can be reduced to 3 to 10 times.

The mechanism by which the effects of the present invention are obtained has not been clarified in detail; however, the following mechanism is considered to be exerted. When a polymer mixture in a melted state enters the space, the pressure, received by the polymer mixture, and the moving speed of the polymer mixture are greatly changed. It is considered that, at this time, a shearing function, an extending function and a folding function are effectively exerted on the melted material. For this reason, the polymer mixture is made to receive these changes, with the result that sufficient mixing and dispersing processes are effectively achieved on the respective components, thereby making it possible to provide the effects of the present invention.

In the case when the space-passing processes are carried out two or more times, by using a device having two or more spaces, the space-passing processes may be achieved by making the polymer mixture pass through each of the spaces one by one, or by using a device having only one space, the space-passing processes may be achieved by repeating the processes two or more times. From the viewpoint of efficiency of continuous driving operations, it is preferable to achieve the space-passing processes by making the polymer mixture pass through each of the spaces one by one, by using the device having two or more spaces.

The face-to-face distance x between two parallel faces in one or more spaces is set to 5 mm or less independently, in particular, to 0.05 to 5 mm, and from the viewpoints of more uniform mixing and dispersing processes, downsizing devices and prevention of bent-up, it is preferably set to 0.5 to 5 mm, more preferably, to 0.5 to 3 mm.

The distance y in the moving direction MD of the polymer mixture in each of the one or more spaces is preferably set to 2 mm or more independently, and from the viewpoint of further improving the effects of the processes, it is preferably set to 3 mm or more, more preferably, to 5 mm or more, most preferably, to 10 mm or more. The upper limit value of the distance y is not particularly limited; however, in the case when the distance is too long, the efficiency becomes poor, and the pressure to be used for moving the polymer mixture in the moving direction MD needs to be increased, failing to provide an economical method. Therefore, the distance y is preferably set to 2 to 100 mm independently, more preferably, to 3 to 50 mm, furthermore preferably, to 5 to 30 mm.

Although not particularly limited, the distance z in the width direction WD of each of the one or more spaces is set to, for example, 20 mm or more, normally, to 100 to 1000 mm.

The flow rate of the polymer mixture upon passing through the space in a melted state is set to 1 g/minute or more at a value per cross-sectional area of 1 $cm^2$, and the upper limit value is not particularly limited with respect to the effects of the present invention; however, in the case when the flow rate is too high, a large installation area of the device is required, failing to provide an economical method. Therefore, the flow rate is preferably set to 10 to 5000 g/minute, more preferably, to 10 to 500 g/minute.

In the present specification, the cross-sectional area is supposed to mean the area of a cross section perpendicular to the moving direction MD.

The flow rate can be measured by dividing the discharging amount (g/min) of the polymer mixture discharged from the discharge opening by the cross-sectional area ($cm^2$) of the space.

The viscosity of the polymer mixture at the time of the space-passing process is not particularly limited as long as the above-mentioned flow rate is achieved at the time of the space-passing, and it is controlled by the heating temperature. The viscosity is set to, for example, 1 to 10000 Pa·s, more preferably, to 10 to 8000 Pa·s.

The viscosity of the polymer mixture is indicated by a value measured by a viscoelasticity measuring apparatus MARS (made by HAAKE Co., Ltd.).

The pressure to be used for moving the polymer mixture in a melted state in the moving direction MD is not particularly limited as long as the above-mentioned flow rate is achieved at the time of the space-passing, and it is preferably set to 0.1 MPa or more in a resin pressure indicated by a pressure difference relative to the atmospheric pressure. The resin pressure corresponds to a pressure of the polymer mixture measured at a portion 1 mm or more inside from the discharge opening of the resin in the space, and can be directly measured by using a pressure gauge. Although more effects can be obtained as the pressure becomes higher, an extremely high shearing heat generation is caused when the resin pressure becomes too high, to sometimes cause decomposition of the polymer; therefore, the resin pressure is preferably set to 500 MPa or less, more preferably, to 50 MPa or less. The resin pressure represents a guide line so as to manufacture a polymer composition having superior physical properties, and the present invention is not intended to be limited by this, if the objective of the present invention can be achieved by using a resin pressure other than the above-mentioned resin pressure.

The temperature of the polymer mixture at the time of the space-passing process is not particularly limited as long as the aforementioned flow rate at the time of passing of the space is achieved; however, since a high temperature exceeding 400° C. causes decomposition of the polymer, the temperature is preferably set to 400° C. or less. Moreover, in the case when the corresponding temperature of the polymer mixture is a temperature that is the Tg or more of the polymer, since the resin pressure does not become extremely high, it is preferably used. In the case when two or more kinds of polymers are used, a value calculated from the rates and the respective Tg's thereof by using the weighted average is defined as Tg. For example, supposing that the Tg of a polymer A is $Tg_A$ (° C.), the used rate thereof is $R_A$ (%), the Tg of a polymer B is $Tg_B$ (° C.) and the used rate thereof is $R_B$ (%), Tg is indicated by "$(Tg_A \times R_A/100)+(Tg_B \times R_B/100)$" where ($R_A+R_B=100$).

The temperature of the polymer mixture at the time of the space-passing process can be controlled by adjusting the heating temperature of the device used for carrying out the corresponding process.

In the present invention, normally, the polymer mixture is melted and kneaded by an extrusion kneader immediately before the space-passing process, and the extruded polymer mixture in a melted state after the kneading process is subjected to the space-passing processes of a predetermined number of times. The melting and kneading methods are not particularly limited, and, for example, a known extrusion kneader that utilizes shearing force may be used. Specific examples thereof include extrusion kneaders, such as a twin-screw extrusion kneader KTX30 and a KTX46 (made by Kobe Steel., Ltd.).

Although not particularly limited, as the melting and kneading conditions, the number of screw revolutions is set to, for example, 50 to 1000 rpm, and as the melting and kneading temperature, the same temperature as the temperature of the polymer mixture at the time of space-passing process may be used.

Referring to drawings that show manufacturing devices for carrying out the space-passing process for the polymer composition, a specific explanation for the space passing processing method will be given. Each of the manufacturing devices for the polymer composition is provided with an inflow opening through which a processing object is made to flow in and a discharge opening through which the processed object is discharged, and also has one or more spaces, each provided with two parallel faces, in a flow passage for the processed object between the inflow opening and the discharge opening.

For example, with respect to a manufacturing device (die) for a polymer composition that carries out a space-passing process once, since its structure is the same as the device shown in FIG. 1 to be described later, except that no space $2a$ is formed and that a reservoir $1a$ and a reservoir $1b$ are made to communicate with each other at a height that is the same as the greatest height of those reservoirs; therefore, the explanation thereof will be omitted.

FIG. 1 shows one example of a manufacturing device (die) for a polymer composition that carries out space-passing processes of two times. FIG. 1 (A) is a schematic perspective view obtained when, with respect to the manufacturing device for a polymer composition that carries out space-passing processes of two times, the inside of the device is perspectively viewed from above. FIG. 1 (B) is a schematic cross-sectional view taken along a P-Q cross section of the device of FIG. 1 (A). The device of FIG. 1 has an approximately rectangular parallelepiped shape as a whole. By coupling an inflow opening 5 of the device of FIG. 1 to the discharge opening of an extrusion kneader (not shown), the extruding force of the extrusion kneader is utilized as a propelling force for the movement of the polymer mixture so that the polymer mixture in a melted state can be moved in the moving direction MD as a whole so as to be made to pass through spaces $2a$ and $2b$. In this manner, since the device of FIG. 1 is coupled to the discharge opening of the extrusion kneader to be utilized, the device may be referred to also as a die.

More specifically, the device of FIG. 1 is provided with the inflow opening 5 used for allowing a processing object flow therein and a discharge opening 6 used for discharging the processed object, and in a flow passage of the processed object between the inflow opening 5 and the discharge opening 6, two spaces ($2a$, $2b$), each formed by two parallel planes, are prepared. Normally, immediately before the spaces $2a$, $2b$, reservoirs $1a$, $1b$, each having a cross-sectional area greater than the cross-sectional area of the space, are prepared respectively. Upon processing, the polymer mixture, extruded out of the extrusion kneader, is made to flow into the reservoir $1a$ in its melted state from the inflow opening 5 in the device 10A of FIG. 1 by the extruding force of the extrusion kneader, and is also made to spread in the width directions WD. Next, the polymer mixture is made to continuously pass through the space $2a$ in the moving direction MD as well as in the width direction WD, to be moved to the reservoir $1b$, and is then further made to pass through the space $2b$ to be discharged from the discharge opening 6.

In the present specification, the cross-sectional area of the reservoir corresponds to the largest cross-sectional area of the reservoir on a vertical cross section relative to the moving direction MD.

In FIG. 1, each of the two face-to-face distances $x_1$ and $x_2$ between two parallel faces in two spaces $2a$ and $2b$ corresponds to the aforementioned distance x, and may be set within the same range as the distance x independently.

In FIG. 1, a distance $y_1$ in the moving direction MD in the space $2a$ and a distance $y_2$ the moving direction MD in the space $2b$ correspond to the aforementioned distance y, and may be set within the same range as the distance y independently.

In FIG. 1, distances $z_1$ in the width direction WD in the spaces $2a$ and $2b$ correspond to the aforementioned distance z, and may be set in the same range as the aforementioned distance z independently, and these normally have the common value.

in FIG. 1, the maximum heights $h_1$ and $h_2$ in the reservoirs $1a$ and $1b$ are respectively set to values greater than the face-to-face distances $x_1$ and $x_2$ of the spaces $2a$ and $2b$ located immediately after, and are normally set in a range from 3 to 100 mm, preferably, from 3 to 50 mm, independently.

In the present specification, in the case of the device having a rectangular parallelepiped shape, the maximum height of the reservoir is supposed to correspond to the maximum height on the perpendicular cross section relative to the width direction WD.

In FIG. 1, a ratio $S_{1a}/S_{2a}$ between the cross-sectional area $S_{2a}$ of the space $2a$ and the maximum cross-sectional area $S_{1a}$ the reservoir $1a$ located immediately before and a ratio $S_{1b}/S_{2b}$ between the cross-sectional area $S_{2b}$ of the space $2b$ and the maximum cross-sectional area $S_{1b}$ of the reservoir $1b$ located immediately before are respectively set to 1.1 or more, in particular, to 1.1 to 1000, independently, and from the viewpoints of uniform mixing and dispersing properties, a small size of the device and prevention of bent-up, these are preferably set to 2 to 100, more preferably, to 3 to 15.

In FIG. 1, a distance $m_1$ in the moving direction MD in the reservoir $1a$ and a distance $m_2$ in the moving direction MD in the reservoir $1b$ may be respective independently 1 mm or more, and from the viewpoint of efficiency of continuous driving operations, preferably set to 2 mm or more, more preferably, to 5 mm or more, furthermore preferably, to 10 mm or more. The upper limit values of the distances $m_1$ and $m_2$ are not particularly limited; however, when the distances are too long, the efficiency becomes poor, and the extruding force of the extrusion kneader coupled to the inflow opening 5 needs to be increased, failing to provide an economical method. Therefore, the distances $m_1$ and $m_2$ are preferably set to 1 to 300 mm independently, more preferably, to 2 to 100 mm, furthermore preferably, to 5 to 50 mm.

Figure 2:
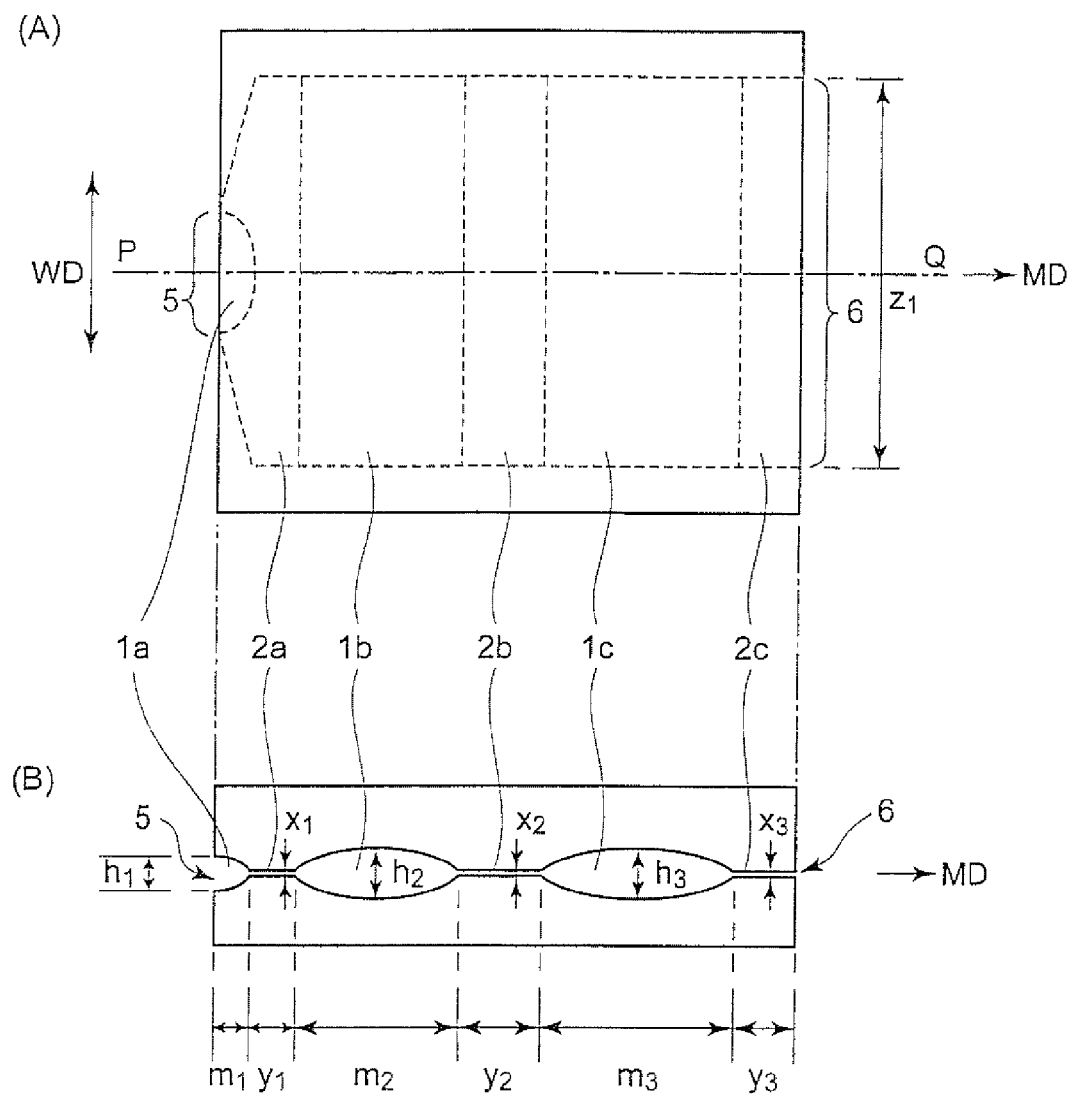
FIG. 2 (A) is a schematic perspective view obtained in the case when, with respect to one example of a manufacturing device that uses a manufacturing method for a nonflammable polyester resin composition of the present invention, the inside of the device is perspectively viewed from above, and FIG. 2 (B) is a schematic cross-sectional view taken along a P-Q cross section of the device of FIG. 2 (A).

FIG. 2 shows one example of a manufacturing device (die) for a polymer composition that carries out space-passing processes of three times. FIG. 2 (A) is a schematic perspective view obtained when, with respect to the manufacturing device for a polymer composition that carries out space-passing processes of three times, the inside of the device is perspectively viewed from above. FIG. 2 (B) is a schematic cross-sectional view taken along a P-Q cross section of the device of FIG. 2 (A). The device of FIG. 2 has an approximately rectangular parallelepiped shape as a whole. By coupling an inflow opening 5 of the device of FIG. 2 to the discharge opening of an extrusion kneader (not shown), the extruding force of the extrusion kneader is utilized as a propelling force for the movement of the polymer mixture so that the polymer mixture in a melted state can be moved in the moving direction MD as a whole so as to be made to pass through spaces 2a, 2b and 2c. In this manner, since the device of FIG. 2 is also coupled to the discharge opening of the extrusion kneader to be utilized, the device may be referred to also as a die.

More specifically, the device of FIG. 2 is provided with the inflow opening 5 used for allowing a processing object to flow therein and a discharge opening 6 used for discharging the processed object, and in a flow passage of the processed object between the inflow opening 5 and the discharge opening 6, three spaces (2a, 2b, 2c), each formed by two parallel planes, are prepared. Normally, immediately before the spaces 2a, 2b, 2c, reservoirs 1a, 1b, 1c, each having a cross-sectional area greater than the cross-sectional area of the space located immediately after, are prepared respectively. Upon processing, the polymer mixture, extruded out of the extrusion kneader in a melted state, is made to flow into the reservoir 1a from the inflow opening 5 in the device 10B of FIG. 2 by the extruding farce of the extrusion kneader, and is also made to spread in the width directions WD. Next, the polymer mixture is made to continuously pass through the space 2a in the moving direction MD as well as in the width direction WD, to be moved to the reservoir 1b, and is then further made to pass through the space 2b to be moved to the reservoir 1c, and is finally made to pass through the space 2c to be discharged from the discharge opening 6.

In FIG. 2, each of the face-to-face distances $x_1$, $x_2$ and $x_3$ between two parallel faces in three spaces 2a, 2b and 2c corresponds to the aforementioned distance x, and may be set within the same range as the distance x independently.

In FIG. 2, a distance $y_1$ in the moving direction MD in the space 2a, a distance $y_2$ in the moving direction MD in the space 2b and a distance $y_3$ in the moving direction MD in the space 2c correspond to the aforementioned distance y, and may be set within the same range as the distance y independently.

In FIG. 2, distances $z_1$ in the width direction WD in the spaces 2a, 2b and 2c correspond to the aforementioned distance z, and may be set in the same range as the aforementioned distance z independently, and these normally have the common value.

In FIG. 2, the maximum heights $h_1$, $h_2$ and $h_3$ in the reservoirs 1a, 1b and 1c are respectively set to values greater than the face-to-face distances $x_1$, $x_2$ and $x_3$ of the spaces 2a, 2b and 2c located immediately after, and are normally set in the same range as those of the maximum heights $h_1$ and $h_2$ of FIG. 1, independently.

In FIG. 2, a ratio $S_{1a}/S_{2a}$ between the cross-sectional area $S_{2a}$ of the space 2a and the largest cross-sectional area $S_{1a}$ of the reservoir 1a located immediately before, a ratio $S_{1b}/S_{2b}$ between the cross-sectional area $S_{2b}$ of the space 2b and the largest cross-sectional area $S_{1b}$ of the reservoir 1b located immediately before and a ratio $S_{1c}/S_{2c}$ between the cross-sectional area $S_{2c}$ of the space 2c and the largest cross-sectional area $S_{1c}$ of the reservoir 1c, located immediately before are respectively set in the same ranges as those of the ratio $S_{1a}/S_{2a}$ and the ratio $S_{1b}/S_{2b}$ in FIG. 1, independently.

In FIG. 2, a distance $m_1$ in the moving direction MD in the reservoir 1a, a distance $m_2$ in the moving direction MD in the reservoir 1b and a distance $m_3$ in the moving direction MD in the reservoir 1c are set in the same ranges as those of the distances $m_1$ and $m_2$ in FIG. 1, independently.

In the present specification, the expression "parallel" is defined to be used as a concept including not only a parallel relationship achieved between two planes, but also a parallel relationship achieved between two curved faces. That is, in FIGS. 1 and 2, each of the spaces 2a, 2b and 2c is formed by two planes; however, not limited to this structure, for example, as indicated by a space 2a shown in FIG. 3 and spaces 2a, 2b and 2c shown in FIG. 4, each space may be formed by two parallel curved faces. "Parallel" means that in the relationship between two faces, the distance between them is constant, and with taking into consideration precision at the time of a device manufacturing process, it is not necessarily required to be strictly "constant", but only required to be substantially "constant". Therefore, the expression "parallel" may be "approximately parallel" within a range in which the objective of the present invention is achieved. In the device having a approximately rectangular parallelepiped shape, the shape and position of the space on a perpendicular cross section relative to the width direction WD are defined as not being changed in the width direction. In the device having an approximately cylindrical shape, the shape and position of the space on a cross section passing through the axis are defined as not being changed in a circumferential direction centered on the axis of the device.

Figure 3:
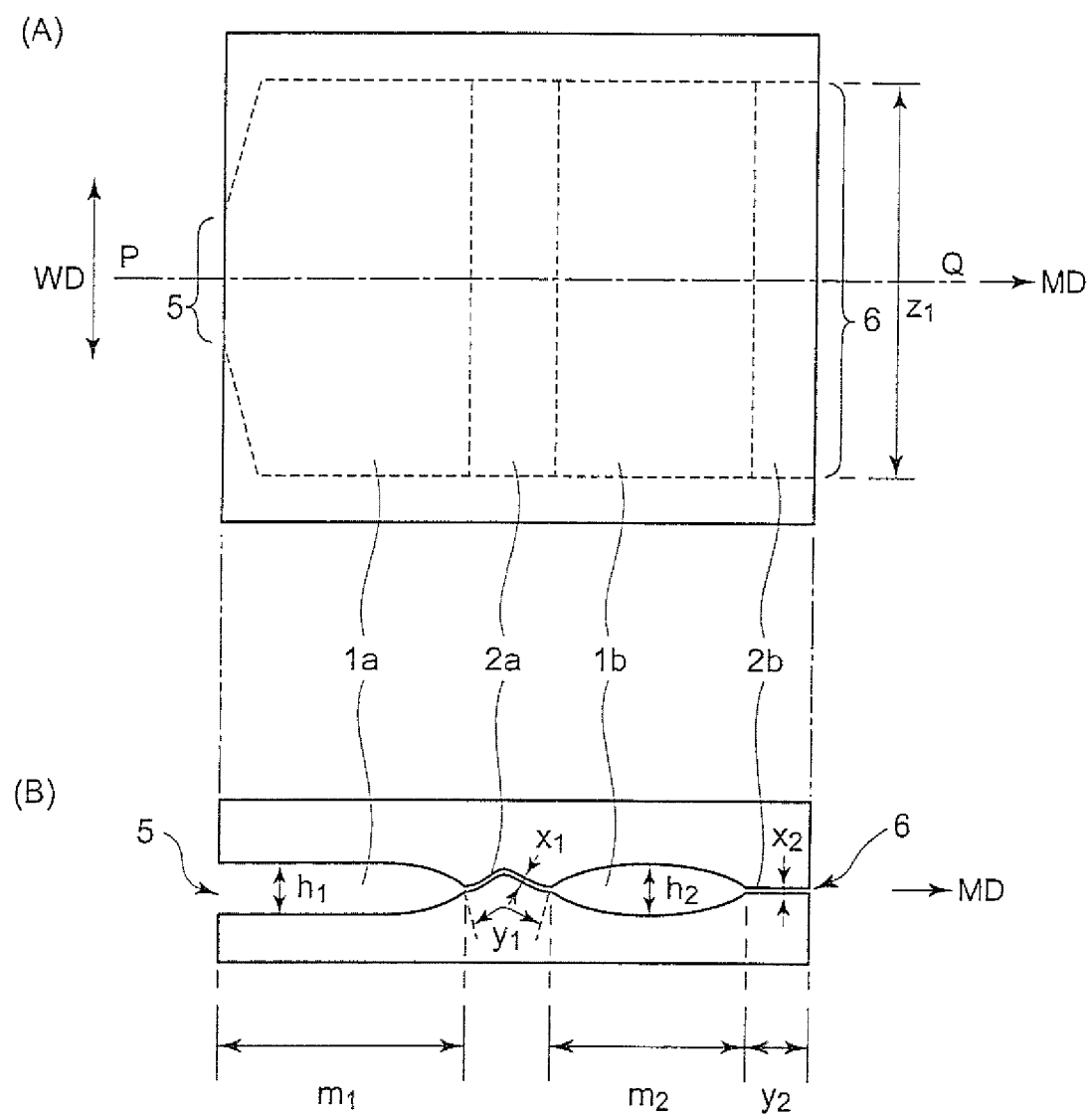
FIG. 3 (A) is a schematic perspective view obtained in the case when, with respect to one example of a manufacturing device that uses a manufacturing method for a nonflammable polyester resin composition of the present invention, the inside of the device is perspectively viewed from above, and FIG. 3 (B) is a schematic cross-sectional view taken along a P-Q cross section of the device of FIG. 3 (A).

FIG. 3 shows one example of a manufacturing device (die) for a polymer composition that carries out space-passing processes of two times. FIG. 3 (A) is a schematic perspective view obtained when, with respect to the manufacturing device for a polymer composition that carries out space-passing processes of two times, the inside of the device is perspectively viewed from above. FIG. 3 (B) is a schematic cross-sectional view taken along a P-Q cross section of the device of FIG. 3 (A). The device of FIG. 3 has an approximately rectangular parallelepiped shape as a whole. In the device of FIG. 3, by coupling an inflow opening 5 to the discharge opening of an extrusion kneader (not shown), the extruding force of the extrusion kneader is utilized as a propelling force for the movement of the polymer mixture so that the polymer mixture in a melted state can be moved in the moving direction MD as a whole so as to be made to pass through spaces 2a, 2b. In this manner, since the device of FIG. 3 is also coupled to the discharge opening of the extrusion kneader to be utilized, the device may be referred to also as a die.

Since the device of FIG. 3 has the same structures as those of the device of FIG. 1 except that its space 2a is composed of two curved faces that are in parallel with each other, the detailed description of the device of FIG. 3 is omitted.

Figure 4:
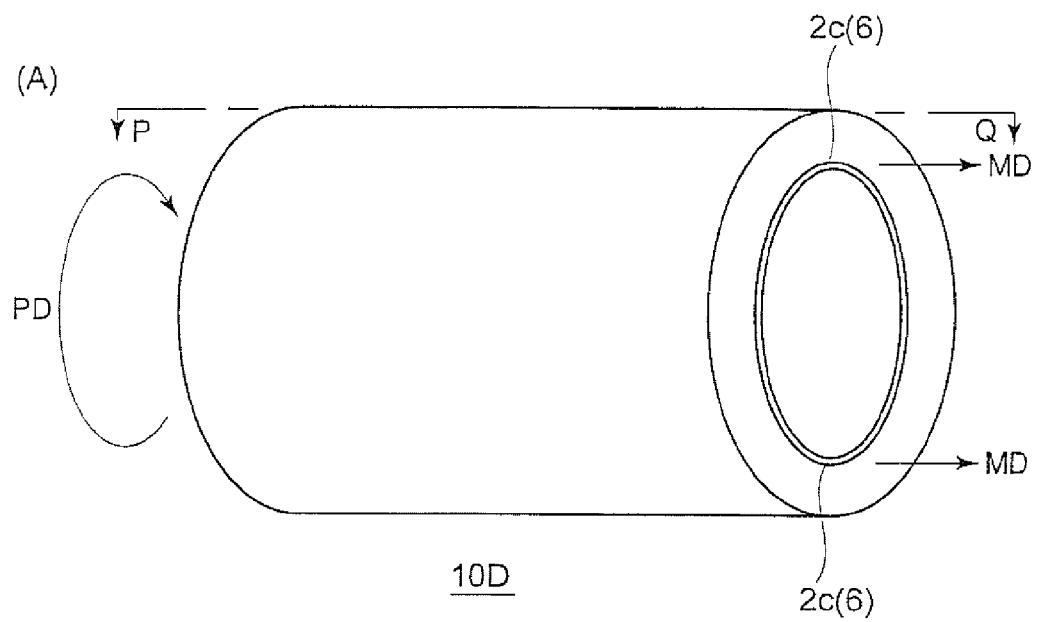
FIG. 4 (A) is a schematic sketch drawing that shows one example of a manufacturing device that uses the manufacturing method for a nonflammable polyester resin composition of the present invention, and FIG. 4 (B) is a schematic cross-sectional view taken along a P-Q cross section that passes through the axis of the device of FIG. 4 (A).
Figure 4:
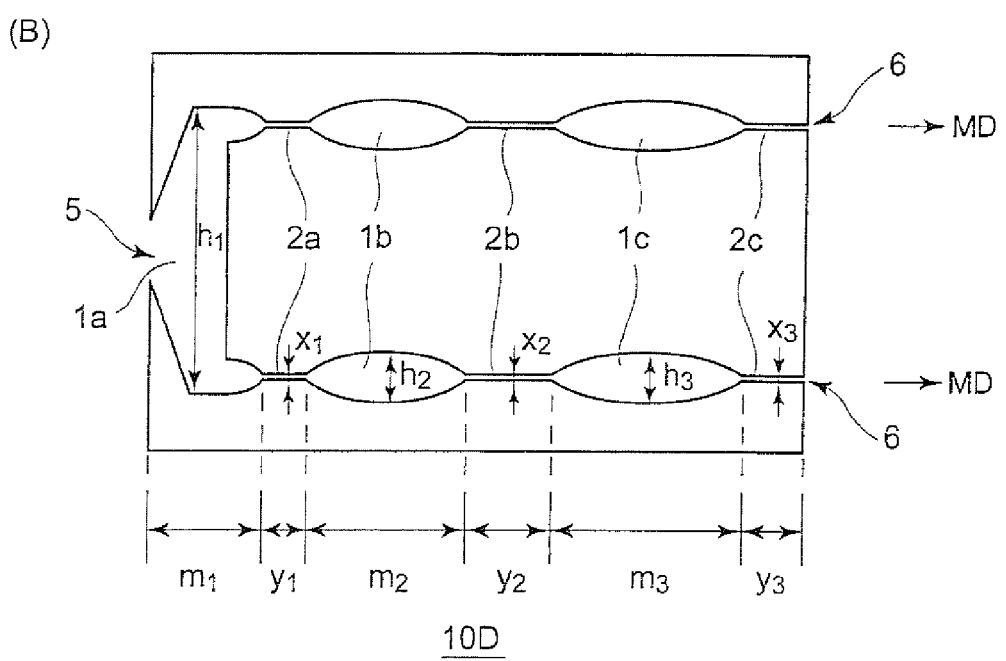

FIG. 4 shows one example of a manufacturing device (die) for a polymer composition that carries out space-passing processes of three times. FIG. 4 (A) is a schematic sketch drawing of the manufacturing device for a polymer composition that carries out space-passing processes of three times, and FIG. 4 (B) is a schematic cross-sectional view taken along a P-Q cross section of the device of FIG. 4 (A). The device of FIG. 4 has an approximately cylindrical shape as a whole so that the device can be miniaturized. In the device of FIG. 4, by coupling an inflow opening 5 to the discharge opening of an extrusion kneader (not shown), the extruding force of the extrusion kneader is utilized as a propelling force for the movement of the polymer mixture so that the polymer mixture in a melted state can be moved in the moving direction MD as a whole so as to be made to pass through spaces 2a, 2b and 2c. In this manner, since the device of FIG. 4 is also coupled to the discharge opening of the extrusion kneader to be utilized, the device may be referred to also as a die.

More specifically, the device of FIG. 4 is provided with the inflow opening 5 used for allowing a processing object to flow therein and a discharge opening 6 used for discharging the processed object, and in a flow passage of the processed object between the inflow opening 5 and the discharge opening 6, three spaces (2a, 2b, 2c), each formed by two curved faces that are in parallel with each other, are prepared. Normally, immediately before the spaces 2a, 2b, 2c, reservoirs 1a, 1b, 1c, each having a cross-sectional area greater than the cross-sectional area of the space located immediately after, are prepared respectively. Upon processing, the polymer mixture, extruded out of the extrusion kneader in a melted state, is made to flow into the reservoir 1a from, the inflow opening 5 in the device 10D of FIG. 4 by the extruding force of the extrusion kneader, and is also made to spread in radial directions. Next, the polymer mixture is made to continuously pass through the space 2a in the moving direction MD as well as in the peripheral direction PD, to be moved to the reservoir 1b, and is then further made to pass through the space 2b to be moved to the reservoir 1c, and is finally made to pass through the space 2c to be discharged from the discharge opening 6.

In FIG. 4, each of the face-to-face distances $x_1$, $x_2$ and $x_3$ between two parallel faces in three spaces 2a, 2b and 2c corresponds to the aforementioned distance x, and may be set within the same range as the distance x independently.

In FIG. 4, a distance $y_1$ in the moving direction MD in the space 2a, a distance $y_2$ in the moving direction MD in the space 2b and a distance $y_3$ in the moving direction MD in the space 2c correspond to the aforementioned distance y, and may be set within the same range as the distance y independently.

In FIG. 4, not particularly limited, the maximum height $h_1$ in the reservoir 1a is normally set to 1 to 100 mm, preferably to 1 to 50 mm.

In FIG. 4, the maximum heights $h_2$ and $h_3$ in the reservoirs 1b and 1c are respectively set to values greater than the face-to-face distances $x_2$ and $x_3$ of the spaces 2b and 2c located immediately after, and are normally set in the same range as those of the maximum heights $h_1$ and $h_2$ of FIG. 1.

In the present specification, in the case of the device having an approximately cylindrical shape, the maximum height of the reservoir is defined as corresponding to the maximum height in the diameter direction of a cross section passing through the axis of the device.

In FIG. 4, a ratio $S_{1a}/S_{2a}$ between the cross-sectional area $S_{2b}$ of the space 2a and the largest cross-sectional area $S_{1a}$ of the reservoir 1a located immediately before is set to 1.2 or more, in particular 1.2 to 10, and from the viewpoints of more uniform mixing and dispersing processes, smaller devices and prevention of bent-up, it is preferably set to 1.2 to 7, more preferably, to 1.2 to 5.

In FIG. 4, a ratio $S_{1b}/S_{2b}$ between the cross-sectional area $S_{2b}$ of the space 2b and the largest cross-sectional area $S_{1b}$ of the reservoir 1b located immediately before and a ratio $S_{1c}/S_{2c}$ between the cross-sectional area $S_{2c}$ of the space 2c and the largest cross-sectional area $S_{1c}$ of the reservoir 1c located immediately before are set in the same ranges as those of the ratio $S_{1a}/S_{2a}$ and the ratio $S_{1b}/S_{2b}$ in FIG. 1, independently.

In FIG. 4, a distance $m_1$ in the moving direction MD in the reservoir 1a, a distance $m_2$ in the moving direction MD in the reservoir 1b and a distance $m_3$ in the moving direction MD in the reservoir 1c are set in the same ranges as those of the distances $m_1$ and $m_2$ in FIG. 1, independently.

Those devices shown in FIGS. 1 to 4 are normally manufactured by using materials for use in producing a die conventionally attached to the discharge opening and used in the field of resin kneading and extruding devices.

After the space-passing process, the polymer mixture that has been subjected to the space-passing process is quickly cooled. The sufficiently uniform mixed and dispersed states of the respective kinds of components, achieved by the space-passing process, are effectively maintained by the quick cooling process.

The quick cooling process is achieved by immersing the polymer composition in a melted state obtained through the space-passing process, as it is, in water at 0 to 60° C. This quick cooling process may also be achieved by cooling by the use of a gas at −40° C. to 60° C., or by making the polymer composition in contact with metal at −40° C. to 60° C. The quick cooling process is not necessarily required to be carried out, and for example, even by simply setting the polymer composition aside to be cooled, the sufficiently uniform mixed and dispersed state of the respective components can be maintained.

The polymer composition thus cooled is normally pelletized by a pulverizing process so as to be easily processed in the next process.

In the present invention, further prior to the melting and kneading processes carried out immediately before the space-passing process of the polymer mixture, she entire components forming the polymer mixture may be preliminarily mixed. For example, after the entire components have been preliminarily mixed, the melting and kneading processes are carried out immediately before the space-passing process, and the space-passing processes are then carried out a predetermined number of times. Immediately before the melting and kneading processes after such a mixing process, from the viewpoint of suppressing a hydrolysis reaction of a polyester resin and an ester exchanging reaction between the polyester resin and a polycarbonate resin, the polymer mixture is preferably dried sufficiently.

As the mixing method, a dry blending method for simply mixing predetermined components in a dry process may be used, or a melting-kneading method in which predetermined components are melted and kneaded by a conventional melting and kneading method, and then cooled and pulverized may be used. In the case of using the melting-kneading method, the same extrusion kneader as described above may be used, with a conventionally known die being attached to discharge opening of the extrusion kneader.

Application of Nonflammable Polyester Resin Composition

The resin composition of the present invention, produced by the above-mentioned methods, are normally cooled and pulverized to be prepared as pellets; therefore, by subjecting the pellets to each of various conventionally known methods, such as an injection molding method, an extrusion molding method, a compression molding method, a blow-in molding method, an injection-compression melding method, or the like, a molded body having a desired shape can be produced. From the viewpoint of suppressing a hydrolysis reaction of a polyester resin and an ester exchanging reaction between the polyester resin and a polycarbonate resin, the resin composition is preferably dried sufficiently prior to the molding process.

Another method may be used in which, the resin composition of the present invention in a melted state, that has been subjected to the space-passing process, is continuously subjected to the above-mentioned various known molding methods, without carrying out cooling and pulverizing processes thereon, so that a molded product having a desired shape may be produced.

The nonflammable polyester resin composition of the present invention is effectively utilized as a molding material or a constituent material in such an application as to require its superior inflammable property, in particular, a self-extinguishing property, as well as superior mechanical performances, such as superior elastic modulus, bending strength and impact strength. For example, such applications include: containers, packing films, household articles, office apparatuses, AV apparatuses, electric and electronic parts, automobile parts and the like.

EXAMPLES

Hereinafter, the present invention will be described concretely by using examples and comparative examples thereof; however, it is needless to say that the invention is not limited to the examples, but that various changes may be made within the scope not departing from the gist of the invention.

First, the following description will explain the raw materials and the kneader used in the following examples and comparative examples.

(A) Components: Polyester Resin
R-PET1 (Collected Polyethylene Terephthalate):

Flake-state pulverized products (washed products) having sizes in a range from 2 to 8 mm, derived from spent waste PET bottles having an intrinsic viscosity of 0.68 dl/g. Additionally, the PET flakes had an end-point temperature (melting point) of a crystalline melting peak of 263° C. measured by a DSC method (using a DSC-7000 made by Seiko Instruments Inc.) at a temperature-rising rate of 20° C./minute. Moreover, the glass transition temperature thereof, measured by the same DSC method, was 69° C.

PET-1:

Polyethylene terephthalate resin pellets having an intrinsic viscosity of 0.78 dl/g. The melting point thereof, measured by the same DSC method, was 267° C., with the glass transition temperature being set to 73° C.

PET-2:

Polyethylene terephthalate resin pellets having an intrinsic viscosity of 0.90 dl/g. The melting point thereof, measured by the same DSC method, was 272° C., with the glass transition temperature being set to 76° C.

PEN-1:

Polyethylene naphthalate resin pellets having an intrinsic viscosity of 1.1 dl/g. The melting point thereof, measured by the same DSC method, was 269° C., with the glass transition temperature being set to 113° C.

(B) Component: Polycarbonate Resin
R-PC1 (Collected Polycarbonate):

After reflection layers, recording layers and the like had been separated from waste compact discs, the resulting resin products were pulverized into flakes having sizes in a range from 1 to 5 mm (PC of the substrate was Iupilon H4000 having a molecular weight of about 15,000, made by Mitsubishi Engineering-Plastics Corporation). The glass transition temperature thereof, measured by the same DSC method, was 148° C.

PC1:

Tarflon A2500 (made by Idemitsu Kosan Co., Ltd., molecular weight: about 23,500). The glass transition temperature thereof, measured by the same DSC method, was 168° C.

(C) Component: Rubbery Polymer
EPDM1:

Ethylene-propylene-diene copolymer rubber (EPDM, Nordel IP made by Dow Chemical Company), Diene Content: 17% by weight, Number-Average Molecular Weight: $10^5$. Tg was set to −37° C.

SBR1:

Butadiene-styrene copolymer rubber (JSR dry SBR, made by JSR Corporation.), Diene Content: 26% by weight, Number-Average Molecular Weight: $5 \times 10^5$. Tg was set to −35° C.

BR1:

Polybutadiene rubber (BR01, made by JSR Corporation), Diene Content: 48% by weight, Number-Average Molecular Weight: $6 \times 10^5$. Tg was set to −34° C.

PUR1:

Urethane rubber (Elastollan 1154D, made by BASF Japan Ltd.), Number-Average Molecular Weight: $10^5$. Hardness (JIS A:54). Tg was set to −20° C.

SIR1:

Silicone rubber (Silastic HCR, made by Toray Dow Corning Company, Ltd.), Number-Average Molecular Weight: 35,000. Tg was set to −42° C.

(D) Component:
PPS1:

Polyphenylene sulfide (Torelina, made by Toray Industries, Inc., Tm: 283° C.),

PNR1:

Phenol resin (PR-12687, made by Sumitomo Bakelite Co., Ltd.), Novolak type phenol resin, Melting point: 78° C., Powdered state.

(E) Component:
TPP: Triphenyl phosphate
P1: Tris (nonylphenyl) phosphite
P2: Bisphenol A bis-diphenyl phosphate
P3: Benzene phosphonate
TPP: Triphenyl phosphate
NY1: 6-Nylon. Amilan CM1021FS (made by Toray Industries, Inc.),
Melting point: 225° C., Melt viscosity: 1200 Pals (230° C.)

Kneading Device:

A twin-screw extruder KTX30 with a pressure-reducing bent, made by Kobe Steel, Ltd., was used as the kneading device. The cylinder unit of this device was composed of 9 blocks of C1 to C9 for every temperature-adjusting blocks, and a material supply port was formed at C1 portion, and a screw combination of a rotor and a kneader was placed at each of C3 portion and C7 portion, with a bent being, formed at C8 portion. Moreover, a predetermined die was attached to a discharge opening, and used. Upon using any one of dies, the kneading device was used under the following conditions:

Cylinder set temperature: C1 to C2/C3 to C9/Die=120/220/250° C.

Screw number of revolutions: 250 rpm

Die A: Die having three gap-space portions, shown in FIG. 2.

Reservoir $1a$: Maximum height $h_1$=10 mm, Maximum cross-sectional area $S_{1a}$=10 cm$^2$, Distance $m_1$ in the moving direction=20 mm;

Space $2a$: Face-to-face distance $x_1$=1 mm, Cross-sectional area $S_{2a}$=6 cm$^2$, Distance $y_1$ in the moving direction=30 mm, Distance $z_1$ in the width direction=300 mm;

Reservoir 1b: Maximum height $h_2$=10 mm, Maximum cross-sectional area $S_{1b}$=30 cm², Distance $m_2$ in the moving direction=20 mm;

Space 2b: Face-to-face distance $x_2$=1 mm, Cross-sectional area $S_{2b}$=6 cm², Distance $y_2$ in the moving direction=30 mm, Distance $z_1$ in the width direction=300 mm;

Reservoir 1c: Maximum height $h_3$=10 mm, Maximum cross-sectional area $S_{1c}$=30 cm², Distance $m_3$ in the moving direction=20 mm;

Space 2c: Face-to-face distance $x_3$=1 mm, Cross-sectional area $S_{2c}$=6 cm², Distance $y_3$ in the moving direction=30 mm.

Die B: Die having two gap-space portions, shown in FIG. 1.

Reservoir 1a: Maximum height $h_1$=10 mm, Maximum cross-sectional area $S_{1a}$=30 cm², Distance $m_1$ in the moving direction=50 mm;

Space 2a: Face-to-face distance $x_1$=1 mm, Cross-sectional area $S_{2a}$=6 cm², Distance $y_1$ in the moving direction 10 mm, Distance $z_1$ in the width direction=300 mm;

Reservoir 1b: Maximum height $h_2$=10 mm, Maximum cross-sectional area $S_{1b}$=30 cm², Distance $m_2$ in the moving direction=50 mm;

Space 2b: Face-to-face distance $x_2$=1 mm, Cross-sectional area $S_{2b}$=6 cm², Distance $y_2$ the moving direction=10 mm, Distance $z_1$ in the width direction=300 mm;

Die C: Die having one gap-space portion (face-to-face distance=1 mm). This die has the same structure as the die shown in FIG. 1, except that, no space 2a is formed, and that instead of the space 2a, the reservoir 1a and the reservoir 1b are made to communicate with each other through a communication path having a height of 10 mm and a distance in the width direction of 300 mm.

Die D (Comparative Example): Die having one space portion (face-to-face distance=8 mm). This die has the same structure as the die shown in FIG. 1, except that, no space 2a is formed, that instead of the space 2a, the reservoir 1a and the reservoir 1b are made to communicate with each other through a communication path having a height of 10 mm and a distance in the width direction of 300 mm, and that the space 2b has a face-to-face distance $x_2$ of 8 mm and a cross-sectional area $S_{2b}$ of 24 cm².

Example/Comparative Example (1) Components shown in Table 1 or Table 2 were dry-blended by using a V-type mixer at predetermined weight percentages, and the mixture was dried at 100° C. under a reduced pressure for 4 hours by using a vacuum drying device. The dried mixture was loaded to a twin-screw kneading device through a material supply inlet, and melt-kneaded under conditions of a discharged amount of 30 kg/hour and a resin pressure of 4 MPa. More specifically, after the resin composition, that had been discharged from the twin-screw kneading device, was made to flow into a predetermined die through its inflow opening in a melted state, the resin composition was made to pass through a predetermined space portion, and is then discharged through a discharge opening. The kneaded matter, discharged from the die, was quickly cooled by being immersed into water at 30° C., and pulverized into pellets by a pelletizer so that a resin composition was obtained.

Evaluation (1) Mechanical Properties of Resin Composition

After the pellet-state resin composition had been dried at 100° C. for 4 hours, it was molded into an oblong test piece having a size of 100 mm×10 mm×4 mm at a cylinder set temperature of 280° C. and a mold temperature of 40° C., by using an injection molding machine (J55ELII, made by the Japan Steel Works, Ltd.). The test piece was subjected to a Charpy impact test (U-notch, R=1 mm) in compliance with JIS-K7111, and also to a bending test in compliance with JIS-K7171. The elastic modulus was obtained from the result of the initial strain of the bending test. The results were ranked in accordance with the following criteria:

Elastic Modulus

⊚: 2.6 CPa or more;
○: 2.2 GPa or more to less than 2.6 GPa;
Δ: 2.0 GPa or more to less than 2.2 GPa (no problems are raised in practical use);
x: less than 2.0 GPa (problems are raised in practical use).

Bending Strength

⊚: 60 MPa or more;
○: 55 MPa or more to less than 60 MPa;
Δ: 50 MPa or more to less than 55 MPa (no problems are raised in practical use);
x: less than 50 MPa (problems are raised in practical use).

Charpy Impact Strength

⊚: 20 kj/m² or more;
○: 10 kj/m² or more to less than 20 kj/m²;
Δ: 6 kj/m² or more to less than 10 kj/m² (no problems are raised in practical use);
x: less than 6 kj/m² (problems are raised in practical use).

(2) Nonflammability Test

The same kneading device as the aforementioned kneading device was used except that the die is altered to a strand die. More specifically, after a pellet-state resin composition had been dried at 100° C. for 4 hours, the resin composition was extruded into a strand shape by using the kneading device, and was cooled. The strand was cut into test pieces having a length of 10 cm, and the test piece was tilted at a 45 degrees angle, while being secured at a portion 1 cm apart from the end, and ignited with a lighter. The results were ranked in accordance with the following criteria:

⊚: The burning strand was self-extinguished within a burning distance of less than 0.3 cm, with a burned portion of less than 0.3 cm;
○: The burning strand was self-extinguished within a burning distance of less than 2 cm, with a burned portion of 0.3 cm or more to less than 2 cm;
Δ: The burning strand was self-extinguished within a burning distance of less than 5 cm, with a burned portion of 2 cm or more to less than 5 cm (no problems were raised in practical use);
x: The burning strand was not self-extinguished within a burning distance of less than 5 cm, with a burned portion of 5 cm or more (problems were raised in practical use).

(3) Dispersion Particle Size of (C) Component

The same test pieces as those used in the evaluation method for the mechanical properties of the resin composition were used, and the dispersion particle size of (C) component was measured by the aforementioned method. FIG. 5 shows an SEM photograph of the test piece using the resin composition of example 2.

Reference Example 1

A resin composition was obtained by using the same method as that of example 1, except that components shown in Table 2 were used, that no die was used and that the kneading process was carried out at the following temperatures.

Cylinder set temperature: C1 to C2/C3 to C9=160/220° C.
Screw number of revolutions: 250 rpm The evaluation process was carried out by using the same method as that of the aforementioned example. Table 4 Shows the results thereof.

Reference Examples 2 to 4

A resin composition was obtained by using the same method as that of example 1, except that components shown in Table 2 were used, that no die was used and that the kneading process was carried out at the following temperatures.

Cylinder set temperature: C1 to C2/C3 to C9=160/220° C.
Screw number of revolutions: 250 rpm The evaluation process was carried out by using the same method as that of the aforementioned example. Table 4 shows the results thereof.

TABLE 1

| | (A) Component | | | | (B) Component | | (C) Component | | | | | (D) Component | | (E) Component | | | | | |
|---|---|---|---|---|---|---|---|---|---|---|---|---|---|---|---|---|---|---|---|
| | R-PET1 | PET1 | PET2 | PEN1 | R-PC1 | PC1 | EPDM1 | SBR1 | BR1 | PUR1 | SIR1 | PPS1 | PNR1 | TPP | P1 | P2 | P3 | NY1 | Die |
| Example 1 | 60 | — | — | — | 10 | — | 10 | — | — | — | — | 1 | 8 | 11 | — | — | — | — | A |
| Example 2 | 60 | — | — | — | 10 | — | 10 | — | — | — | — | 0 | 9 | 11 | — | — | — | — | B |
| Example 3 | 60 | — | — | — | 10 | — | 10 | — | — | — | — | 0 | 9 | 11 | — | — | — | — | C |
| Example 4 | 68 | — | — | — | 11 | — | 11 | — | — | — | — | 9 | — | 1 | — | — | — | — | A |
| Example 5 | 45 | — | — | — | 30 | — | 20 | — | — | — | — | 2 | — | 3 | — | — | — | — | A |
| Example 6 | 80 | — | — | — | 5 | — | 5 | — | — | — | — | 5 | — | 5 | — | — | — | — | A |
| Example 7 | 60 | — | — | — | 10 | — | 5 | — | — | — | — | 18 | — | 7 | — | — | — | — | A |
| Example 8 | — | 71 | — | — | — | 10 | 10 | — | — | — | — | 0.9 | 8 | — | — | — | — | 0.1 | A |
| Example 9 | — | 75 | — | — | — | 10 | — | 10 | — | — | — | 0.9 | 4 | — | — | — | — | 0.1 | A |
| Example 10 | — | 70 | — | — | — | 10 | — | — | 10 | — | — | 0.9 | 4 | — | 5 | — | — | 0.1 | A |
| Example 11 | — | 70 | — | — | — | 10 | — | — | — | 10 | — | 0.9 | 4 | — | — | 5 | — | 0.1 | A |
| Example 12 | — | — | 70 | — | — | 10 | — | — | — | — | 10 | 0.9 | 4 | — | — | — | 5 | 0.1 | A |
| Example 13 | — | — | — | 65 | — | 10 | 10 | — | — | — | — | 1.8 | 8 | 5 | — | — | — | 0.2 | A |
| Example 14 | — | — | — | 65 | — | 10 | 10 | — | — | — | — | 1.8 | 8 | 5 | — | — | — | 0.2 | A |
| Example 15 | — | — | — | 65 | — | 10 | 10 | — | — | — | — | 1.8 | 8 | 5 | — | — | — | 0.2 | A |

TABLE 2

| | (A) Component | | | | (B) Component | | (C) Component | | | | | (D) Component | | (E) Component | | | | | |
|---|---|---|---|---|---|---|---|---|---|---|---|---|---|---|---|---|---|---|---|
| | R-PET1 | PET1 | PET2 | PEN1 | R-PC1 | PC1 | EPDM1 | SBR1 | BR1 | PUR1 | SIR1 | PPS1 | PNR1 | TPP | P1 | P2 | P3 | NY1 | Die |
| Comparative Example 1 | 60 | — | — | — | 10 | — | 10 | — | — | — | — | 9 | — | 11 | — | — | — | — | D |
| Comparative Example 2 | 60 | — | — | — | 10 | — | 10 | — | — | — | — | 9 | — | 11 | — | — | — | — | without die* |
| Comparative Example 3 | 30 | — | — | — | 50 | — | 10 | — | — | — | — | 2 | 3 | 5 | — | — | — | — | A |
| Comparative Example 4 | 90 | — | — | — | 4 | — | 3 | — | — | — | — | 1 | — | 2 | — | — | — | — | A |
| Comparative Example 5 | — | 60 | — | — | 4 | — | 36 | — | — | — | — | — | — | 0 | — | — | — | — | A |
| Comparative Example 6 | — | 40 | — | — | 45 | — | 5 | — | — | — | — | 2 | 3 | 5 | — | — | — | — | A |
| Comparative Example 7 | — | — | 46 | — | — | 10 | 10 | — | — | — | — | 4 | — | 30 | — | — | — | — | A |
| Comparative Example 8 | — | — | 53 | — | — | 10 | 10 | — | — | — | — | | | | | | | | |
| Comparative Example 9 | 30 | — | — | — | 40 | — | 10 | — | — | — | — | | | | | | | | |
| Comparative Example 10 | 43.9 | — | — | — | 45 | — | 5 | — | — | — | — | | | | | | | | |
| Comparative Example 11 | 60 | — | — | — | 30 | — | 3 | — | — | — | — | | | | | | | | |
| Comparative Example 12 | 65 | — | — | — | 4 | — | 20 | — | — | — | — | | | | | | | | |
| Comparative Example 13 | 85 | — | — | — | 5 | — | 5 | — | — | — | — | | | | | | | | |
| Comparative Example 14 | 57 | — | — | — | 19 | — | 20 | — | — | — | — | | | | | | | | |
| Comparative Example 15 | 79 | — | — | — | 10 | — | 9 | — | — | — | — | | | | | | | | |
| Comparative Example 16 | 45 | — | — | — | 10 | — | 35 | — | — | — | — | | | | | | | | |
| Reference Example 1 | 60 | — | — | — | 10 | — | 10 | — | — | — | — | | | | | | | | |
| Reference Example 2 | 60 | — | — | — | 30 | — | 10 | — | — | — | — | | | | | | | | |
| Reference Example 3 | 60 | — | — | — | 30 | — | — | — | — | 10 | — | | | | | | | | |
| Reference Example 4 | 60 | — | — | — | 30 | — | — | — | — | — | 10 | | | | | | | | |

TABLE 2-continued

| | | | | | | | | |
|---|---|---|---|---|---|---|---|---|
| Comparative Example 8 | 25 | — | 2 | — | — | — | — | A |
| Comparative Example 9 | 10 | — | 10 | — | — | — | — | A |
| Comparative Example 10 | 6 | — | 0.1 | — | — | — | — | A |
| Comparative Example 11 | 2 | — | 5 | — | — | — | — | A |
| Comparative Example 12 | 6 | — | 5 | — | — | — | — | A |
| Comparative Example 13 | 3 | — | 2 | — | — | — | — | A |
| Comparative Example 14 | 4 | — | 0 | — | — | — | — | A |
| Comparative Example 15 | 1 | — | 1 | — | — | — | — | A |
| Comparative Example 16 | 4 | — | 6 | — | — | — | — | A |
| Reference Example 1 | 9 | — | 11 | — | — | — | — | Without die* |
| Reference Example 2 | — | — | — | — | — | — | — | without die* |
| Reference Example 3 | — | — | — | — | — | — | — | without die* |
| Reference Example 4 | — | — | — | — | — | — | — | without die* |

*In comparative example 2 and reference examples 1 to 4, the melt-kneading process was carried out with a die removed therefrom.

TABLE 3

| | Nonflammable Property | Elastic Modulus (GPa) | Bending Strength (MPa) | Impact Strength (kj/m$^2$) | Dispersion Particle Size of (C) Component (μm) |
|---|---|---|---|---|---|
| Example 1 | ⊙ | 2.8 ⊙ | 88 ⊙ | 30 ⊙ | 0.5 |
| Example 2 | ⊙ | 2.6 ○ | 58 ○ | 15 ○ | 7.5 |
| Example 3 | ⊙ | 2.2 △ | 52 △ | 8 △ | 12.5 |
| Example 4 | ⊙ | 2.7 ⊙ | 90 ⊙ | 34 ⊙ | 0.8 |
| Example 5 | ⊙ | 2.9 ⊙ | 81 ⊙ | 120 ⊙ | 1.2 |
| Example 6 | ○ | 2.7 ⊙ | 80 ⊙ | 25 ⊙ | 0.9 |
| Example 7 | ⊙ | 2.8 ⊙ | 85 ⊙ | 24 ⊙ | 1.1 |
| Example 8 | ⊙ | 2.8 ⊙ | 79 ⊙ | 100 ⊙ | 1.2 |
| Example 9 | ⊙ | 2.7 ⊙ | 81 ⊙ | 35 ⊙ | 1.1 |
| Example 10 | ⊙ | 2.9 ⊙ | 76 ⊙ | 32 ⊙ | 0.5 |
| Example 11 | ⊙ | 2.8 ⊙ | 59 ○ | 15 ○ | 0.8 |
| Example 12 | ⊙ | 2.8 ⊙ | 54 ○ | 9 △ | 1.2 |
| Example 13 | ⊙ | 3.3 ⊙ | 92 ⊙ | 20 ⊙ | 0.5 |
| Example 14 | ⊙ | 3.1 ⊙ | 89 ⊙ | 20 ⊙ | 0.6 |
| Example 15 | ⊙ | 3.2 ⊙ | 90 ⊙ | 24 ⊙ | 0.7 |

TABLE 4

| | Nonflammable Property | Elastic Modulus (GPa) | Bending Strength (MPa) | Impact Strength (kj/m$^2$) | Dispersion Particle Size of (C) Component (μm) |
|---|---|---|---|---|---|
| Comparative Example 1 | X | 2.6 ○ | 52 △ | 7 △ | 21 |
| Comparative Example 2 | X | 2.6 ○ | 50 △ | 6 △ | 23 |
| Comparative Example 3 | X | 3.1 ⊙ | 50 △ | 4 X | 28 |
| Comparative Example 4 | X | 1.9 X | 48 X | 4 X | 21 |
| Comparative Example 5 | X | 1.6 X | 35 X | 5 X | 22 |
| Comparative Example 6 | X | 2.7 ⊙ | 51 △ | 4 X | 23 |
| Comparative Example 7 | △ | 2.5 ○ | 37 X | 4 X | 21 |
| Comparative Example 8 | X | 2.1 △ | 46 X | 3 X | 22 |
| Comparative Example 9 | X | 2.9 ⊙ | 49 X | 5 X | 22 |
| Comparative Example 10 | X | 3.0 ⊙ | 48 X | 3 X | 28 |
| Comparative Example 11 | X | 2.7 ⊙ | 42 X | 2 X | 25 |
| Comparative Example 12 | X | 2.4 ○ | 47 X | 5 X | 22 |
| Comparative Example 13 | X | 2.0 △ | 53 △ | 3 X | 27 |
| Comparative Example 14 | X | 1.9 X | 42 X | 8 △ | 23 |
| Comparative Example 15 | X | 2.0 △ | 47 X | 9 △ | 24 |
| Comparative Example 16 | X | 1.9 X | 38 X | 5 X | 110 |
| Reference Example 1 | X | 2.5 ○ | 51 △ | 5 X | 53 |
| Reference Example 2 | X | 2.2 ○ | 50 △ | 8 △ | 45 |
| Reference Example 3 | X | 2.1 △ | 49 X | 7 △ | 80 |
| Reference Example 4 | X | 2.0 △ | 48 X | 3 X | 65 |

Effects of the Invention

The nonflammable polyester resin composition produced by the method of the present invention and the molded products obtained by using the resin composition are allowed to exert a superior nonflammable property, in particular, a self-extinguishing property, and superior in mechanical performances, such as sufficient elastic modulus, bending strength and impact strength, without the necessity of containing a halogen-atom-containing nonflammable agent. These effects can also be obtained even in the case of reutilizing polyester resins and/or polycarbonate resins obtained from waste mold-processed products to be disposed.

What is claimed is:

1. A method for manufacturing a nonflammable polyester resin composition comprising:
    making a polymer mixture containing the following (A) to (E) components in a melted state,
    (A) a polyester resin of 40 to 80% by weight relative to the total amount of the composition,
    (B) a polycarbonate resin of 5 to 40% by weight relative to the total amount of the composition, (C) a rubbery polymer of 5 to 30% by weight relative to the total amount of the composition, (D) a polyphenylene sulfide resin and/or a phenol resin of 2 to 20% by weight relative to the total amount of the composition, and (E) a phosphorus-containing acid ester compound and/or a polyamide resin of 0.1 to 25% by weight relative to the total amount of the composition; and passing the melted polymer mixture through a space between two parallel faces, with a face-to-face distance x being set to 0.5 mm to 5 mm, two or more times, to produce the non-flammable polyester resin composition, wherein the space is immediately preceded by a reservoir and the reservoir has a cross sectional area greater than the space that the reservoir precedes and the melted polymer mixture passes directly from the reservoir to the space.

2. The method of claim 1, wherein the polyester resin is polyethylene terephthalate and/or polyethylene naphthalate.

3. The method of claim 1, wherein the polyester resin is resin pieces obtained by pulverizing waste polyethylene terephthalate resin products.

4. The method of claim 1, wherein the polycarbonate resin is resin pieces obtained by pulverizing waste polycarbonate resin products.

5. The method of claim 1, wherein the polyester resin has an intrinsic viscosity in a range from 0.65 to 1.30 dl/g.

6. The method of claim 1, wherein the polyester resin has a melting point in a range from 220 to 290° C. and a glass transition temperature in a range from 60 to 150° C.

7. The method of claim 1, wherein the (A) component is contained in an amount of 50 to 75% by weight relative to the total amount of the composition.

8. The method of claim 1, wherein the polycarbonate resin has a viscosity average molecular weight in a range from 10,000 to 40,000.

9. The method of claim 1, wherein the polycarbonate resin has a glass transition temperature from 140 to 270° C.

10. The method of claim 1, wherein the (B) component is contained in an amount of 10 to 30% by weight relative to the total amount of the composition.

11. The method of claim 1, wherein the rubbery polymer has a number-average molecular weight in a range from 30,000 to 500,000.

12. The method of claim 1, wherein the rubbery polymer is contained in an amount of 5 to 15% by weight relative to the total amount of the composition.

13. The method of claim 1, wherein the polymer mixture contains the polyphenylene sulfide resin and the phenol resin in combination.

14. The method of claim 1, wherein the polymer mixture further contains a cross-linking agent in a range from 0.01 to 0.1% by weight relative to the total amount of the resin composition.

15. The method of claim 1, wherein the face-to-face distance x is set to 0.5 to 3 mm.

16. The method of claim 1, wherein the space has a distance y in the moving direction MD of the polymer mixture set to 3 to 50 mm.

17. The method of claim 1, wherein the polymer mixture in a melted state passes through the space at a flow rate of 10 to 500 g/minute per space's cross-sectional area of 1 $cm^2$.

18. The method of claim 1, wherein the polymer mixture has a viscosity of 10 to 8000 Pa·s at the time of the space-passing process.

19. The method of claim 1, wherein the space has a distance Z in a width direction WD of the polymer mixture set to 100 mm to 1000 mm.

* * * * *